(12) United States Patent
Alouini et al.

(10) Patent No.: US 11,201,645 B2
(45) Date of Patent: Dec. 14, 2021

(54) MASSIVE MULTIPLE-INPUT MULTIPLE-OUTPUT SYSTEM AND METHOD

(71) Applicant: KING ABDULLAH UNIVERSITY OF SCIENCE AND TECHNOLOGY, Thuwal (SA)

(72) Inventors: Mohamed-Slim Alouini, Thuwal (SA); David Elliot Keyes, Thuwal (SA); Hatem Ltaief, Thuwal (SA); Adel Dabah, Algiers (DZ); Zouheir Rezki, Moscow, ID (US)

(73) Assignees: KING ABDULLAH UNIVERSITY OF SCIENCE AND TECHNOLOGY, Thuwal (SA); RESEARCH CENTER ON SCIENTIFIC AND TECHNICAL INFORMATION, Algiers (DZ)

( * ) Notice: Subject to any disclaimer, the term of this patent is extended or adjusted under 35 U.S.C. 154(b) by 0 days.

(21) Appl. No.: 17/201,405

(22) Filed: Mar. 15, 2021

(65) Prior Publication Data
US 2021/0288697 A1 Sep. 16, 2021

Related U.S. Application Data

(60) Provisional application No. 62/990,213, filed on Mar. 16, 2020.

(51) Int. Cl.
*H04B 7/04* (2017.01)
*H04B 7/0452* (2017.01)
*H04B 7/0417* (2017.01)

(52) U.S. Cl.
CPC ......... *H04B 7/0452* (2013.01); *H04B 7/0417* (2013.01)

(58) Field of Classification Search
CPC ........................... H04B 7/0452; H04B 7/0417
See application file for complete search history.

(56) References Cited

U.S. PATENT DOCUMENTS

2012/0254251 A1* 10/2012 Barbosa ............. G06F 16/8373
707/797
2016/0134344 A1* 5/2016 Patel ................. H04L 25/03891
370/328

OTHER PUBLICATIONS

"BLAS. Basic Linear Algebra Subprograms", 2013, downloaded Mar. 24, 2021, (http://www.netlib.org/blas).
Fincke, U., et al., "Improved Methods for Calculating Vectors of Short Length in a Lattice, Including a Complexity Analysis," Mathematics of Computation, Apr. 1985, vol. 44, No. 170, pp. 463-471, American Mathematical Society.
(Continued)

*Primary Examiner* — Jean B Corrielus
(74) *Attorney, Agent, or Firm* — Patent Portfolio Builders PLLC

(57) ABSTRACT

A detection method is presented that combines two non-linear approaches, the Sphere Decoder (SD) and the K-best algorithms, to identify symbols transmitted over a communication channel in a multiple input-multiple output (MIMO) communication system. A parallel implementation on a x86 computer system is presented, which reduces the number of evaluations by branching over plural symbols and diversifies the search process, which may rapidly reduce the radius and thus, the time complexity of the computer system.

20 Claims, 22 Drawing Sheets

(56) References Cited

OTHER PUBLICATIONS

Hassibi, B., et al., "On the Sphere-Decoding Algorithm I. Expected Complexity," IEEE Transactions on Signal Processing, Jul. 18, 2005, vol. 53, No. 8, pp. 2806-2818.

Nikitopoulos, K., et al., "Geosphere: Consistently Turning MIMO Capacity into Throughput," ACM SIGCOMM Computer Communication Review, Aug. 2014, vol. 44, No. 4, p. 631-642.

Nikitopoulos, K., et al., "Massively Parallel Tree Search for High-Dimensional Sphere Decoders," IEEE Transactions on Parallel and Distributed Systems, Oct. 11, 2018, vol. 30, No. 10, pp. 2309-2325, IEEE.

Viterbo, E., et al., "A Universal Lattice Code Decoder for Fading Channels," IEEE Transactions on Information Theory, Jul. 1999, vol. 45, No. 5, pp. 1639-1642, IEEE.

Wong, K.-W., et al., "A VLSI Architecture of a K-Best Lattice Decoding Algorithm for MIMO Channels," 2002 IEEE International Symposium on Circuits and Systems (ISCAS), Phoenix-Scottsdale, AZ, USA, May 26-29, 2002, vol. 3, IEEE, pp. III-273-III-276.

\* cited by examiner

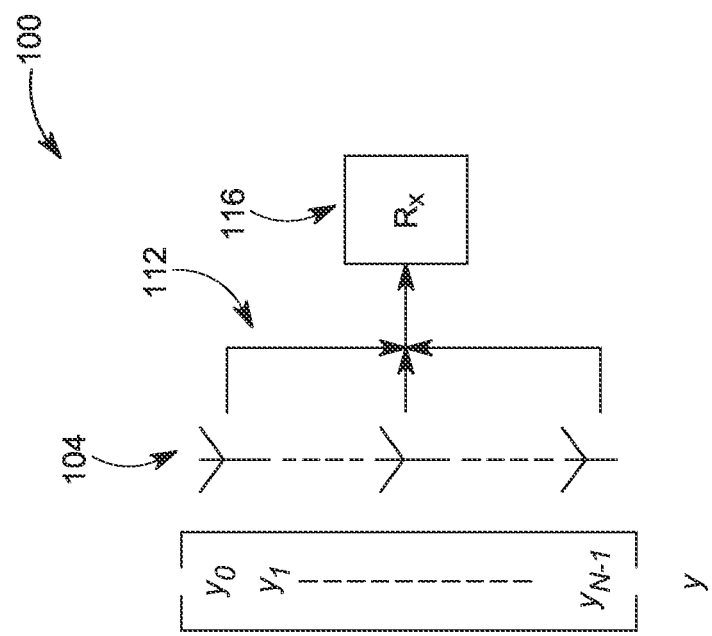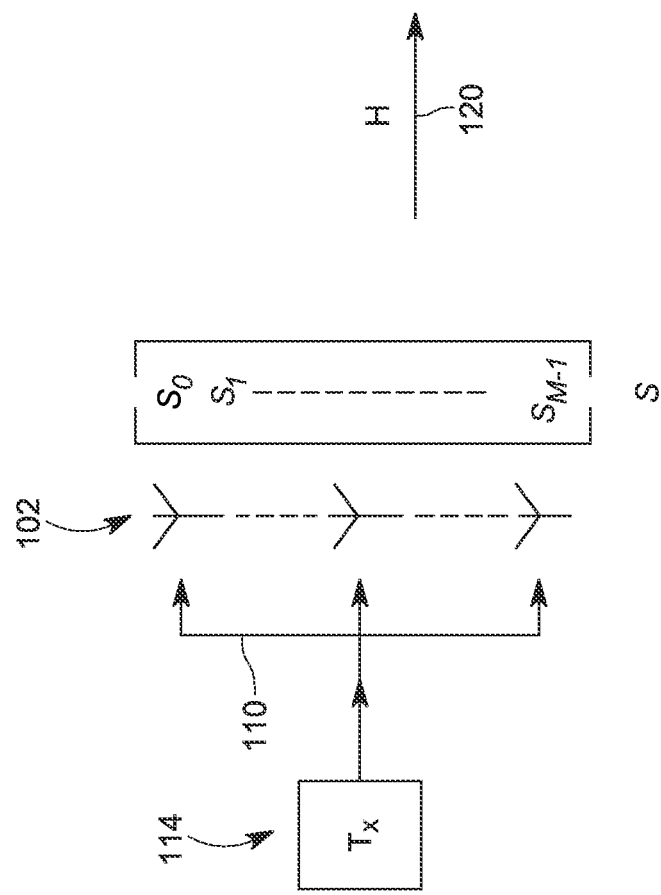
FIG. 1

Algorithm 1: The Sphere Decoder (SD) Algorithm.

302 {
    Data: Received signal $y$
    Constellation order $\Omega$
    Channel estimation $H$
    Noise variance estimation $\sigma^2$
    Radius $r$
}

Result: Decoded vector $\hat{s}$ 1  initialization;
2  List $\leftarrow$ root;  (304)
3  while *List != ∅* do
4    $P$ = select_node (List);  (310)
5    List = List - $\{P\}$;
6    Generate successors $P_i$ of $P$ / $i = \{1,...,|\Omega|\}$;  (306)
7    for *each $P_i$* do
8      if $E(P_i) < r$ then  (308)
9        if *$P_i$ is a leaf node (complete solution)* then
10          $r = E(P_i)$;
11          (The evaluation of sub-problem $P_i$.)
12          $\hat{s} = F_{P_i}$;
13        else
14          List = List $\cup$ $P_i$;
15        end
16      else
17        prune the branch;
18      end
19    end
20  end

FIG. 3

MASSIVE MULTIPLE-INPUT MULTIPLE-OUTPUT SYSTEM AND METHOD

CROSS-REFERENCE TO RELATED APPLICATION

This application claims priority to U.S. Provisional Patent Application No. 62/990,213, filed on Mar. 16, 2020, entitled "ENABLING MASSIVE MULTIPLE-IMPUTE MULTIPLE-OUTPUT SYSTEMS FOR WIRELESS COMMUNICATIONS," the disclosure of which is incorporated herein by reference in its entirety.

BACKGROUND

Technical Field

Embodiments of the subject matter disclosed herein generally relate to a system and method for delivering a large amount of data through a wireless connection, by using a large number of antennas while providing a good quality of service and supporting a large number of connected devices.

Discussion of the Background

In the 5G era and beyond (i.e., 6G), Massive Multiple-Input Multiple-Output (M-MIMO) will continue to play an important role in providing a good spectral efficiency. MIMO technology represents a generalization of Single-Input Single-Output (SISO) technology that increases the capacity of a radio link by sending multiple data streams at the same time. Due to their obvious advantages, MIMO systems have already been incorporated into many wireless communication network protocols such as IEEE 802.11n (Wi-Fi), IEEE 802.11ac (Wi-Fi), etc.

Massive MIMO is a new emerging technology that aims to amplify all the benefits of a traditional MIMO by further scaling the number of antennas up to several hundreds. With the challenge of reaching ten gigabits speed in 5G communication networks and the advent of the Internet of Things (IoT), massive MIMO systems are viewed by many as one of the key technologies to sustain a high-quality of service when dealing with the next generation networks. The challenge in these networks resides in the huge number of connected devices, each exchanging enormous quantities of data (voice, video, etc.) under a real-time response constraint.

In addition to these challenges, increasing the number of antennas raises several problems, especially in terms of energy efficiency and complexity caused by the signal decoding procedure. Indeed, when scaling up the number of antennas, decoding a message becomes one of the most time-consuming operations. In order to maintain a real-time response, researchers generally use linear decoders, which are characterized by low-complexity with a real-time response, but poor performance in terms of Bit Error Rate (BER). In order to achieve near-optimal signal decoding, researchers rely on the Maximum Likelihood (ML) and Sphere Decoder (SD) algorithms [1], [2], [3].

The ML decoder performs a brute force exploration of all possible combinations in the search space of the transmitted vector. Its complexity increases exponentially with the number of antennas making it impossible, in practice, to be deployed for massive MIMO systems. The SD algorithm is another near-optimal decoder derived from the ML algorithm, and the SD algorithm reduces the size of its search space, thus, lowering its complexity. The SD algorithm compares the received vector with only those solutions inside a sphere of a given radius. The radius of the sphere impacts the complexity and the BER of the overall MIMO system: the smaller the radius, the lower the search space (i.e., the complexity), but at the cost of possibly missing the actual sent vector. Thus, tuning the radius for the SD algorithm is required not only to identify the actual sent vector, but also to execute the corresponding procedure under real-time constraints. Nevertheless, it turns out that for massive MIMO systems, the resulting search space may still be too large to operate on and may result in high complexity.

Roger et al. (Roger, S., Ramiro, C., Gonzalez, A., Almenar, V., and Vidal, A. M. Fully parallel gpu implementation of a fixed-complexity soft-output mimo detector. IEEE Transactions on Vehicular Technology 61, 8 (2012), 3796-3800) propose a parallel fixed complexity SD for MIMO systems with bit-interleaved coded modulation. Their parallel approach exploits multicore processors to compute the preprocessing phase of the algorithm, and the massively GPU hardware resources to simultaneously process the detection phase for all N sub-carriers in the system.

Jozsa et al. (Jozsa, C. M., Kolumban, G., Vidal, A. M., Martinez-Zaldivar, F.-J., and Gonzalez, A. New parallel sphere detector algorithm providing high-throughput for optimal mimo detection. Procedia Computer Science 18 (2013), 2432-2435) propose a GPU-based SD algorithm for multichannel (i.e., sub-carriers) MIMO systems. Their approach performs multiple detections simultaneously on the GPU, which increases the throughput. Moreover, a second level of parallelism introduced within each detection relies on the GPU thread block to accelerate the exploration process of the SD algorithm.

Wu et al. (Wu, M., Yin, B., Wang, G., Studer, C., and Cavallaro, J. R. Gpu acceleration of a configurable n-way mimo detector for wireless systems. Journal of Signal Processing Systems 76, 2 (2014), 95-108) propose an improved version of their initial parallel decoder to increase the throughput of a flexible N-way MIMO detector using GPU-based computations. This problem consists in dividing the available bandwidth into multiple sub-carriers. Each sub-carrier corresponds to an independent MIMO detection problem. Therefore, the receiver needs to perform multiple MIMO detection procedures. The authors' idea is to use multiple GPU blocks to simultaneously execute multiple MIMO detection algorithms. To support multiple detections on the GPU, the authors use a soft-output MIMO detection, which engenders a low memory footprint. The results show a good throughput, outperforming the results presented by Roger et al.

The main problems with the above approaches are twofold. The scalability is a serious bottleneck for large numbers of antennas due the limited amount of GPU memory in the presence of multi-carriers. Moreover, the high latency increases the complexity due to the slow PCIe interconnect, when performing data movement between CPU host and GPU device.

Chen and Leib (Chen, T., and Leib, H. Gpu acceleration for fixed complexity sphere decoder in large mimo uplink systems. In IEEE 28th Canadian Conference on Electrical and Computer Engineering (CCECE), 2015 (2015), IEEE, pp. 771-777) propose a GPU-based Fixed Complexity Sphere Decoder (FCSD) for large-scale MIMO uplink systems. The authors reported a speedup around 7× for large MIMO systems and constellation sizes compared to their CPU implementation. However, the time complexity of their approach is significant even for small numbers of antennas.

Arfaoui et al. (Arfaoui, M.-A., Ltaief, H., Rezki, Z., Alouini, M.-S., and Keyes, D. Efficient Sphere Detector Algorithm for Massive MIMO Using GPU Hardware Accelerator. Procedia Computer Science 80 (2016), 2169-2180. International Conference on Computational Science 2016, ICCS 2016, 6-8 Jun. 2016, San Diego, Calif., USA) propose a GPU-based SD algorithm in which a Breadth-First exploration Strategy (BFS) is used to increase the GPU resource occupancy. However, increasing the GPU hardware utilization using BFS increases the complexity due to the limited impact on the pruning process, especially in low Signal-to-Noise Ratio (SNR) situations.

Christopher et al. (Husmann, C., Georgis, G., Nikitopoulos, K., and Jamieson, K. Flexcore: Massively parallel and flexible processing for large {MIMO} access points. In 14th {USENIX} Symposium on Networked Systems Design and Implementation ({NSDI} 17) (2017), pp. 197-211) propose a parallel flexible decoder for large MIMO systems using GPU and FPGA architectures. Their algorithm contains two phases. A first preprocessing phase chooses parts of the SD search tree to explore, and a second phase maps each of the chosen parts of the SD tree to a single processing element (GPU or FPGA). The results are presented for a 12×12 MIMO system using a 64-QAM modulation. It is noted that a system having more than 10 receivers and 10 transmitters is considered herein to be a massive MIMO.

Nikitopoulos et al. propose the design and implementation of a parallel multi-search SD approach for large MIMO search tree using multicore CPU and Very-Large-Scale Integration (VLSI) architectures. After the preprocessing phase in which they obtain a processing order of the tree branches, the authors split the search tree into several sub-trees. Each sub-tree is then mapped on a processing element and explored using a depth-first strategy. However, the authors do not take into consideration the load balancing problem, which may arise in modulations with dense constellations. They also do not update the sphere radius at runtime, which may negatively affect the time complexity of their parallel implementation. The authors report optimal results for a 10×10 MIMO system using 16-QAM modulation and approximate results for a 16×16 MIMO system using 64-QAM modulation.

Most of the existing work report experimental results for rather small MIMO configuration systems and do not report or satisfy the real-time response constraint. In addition, they rely on GPUs to accelerate the partial or complete exploration of SD search-trees. While GPUs are throughput-oriented devices, the resulting size of the SD search space still remains prohibitive to maintain a decent time complexity. These problems associated with the M-MIMO systems has slowed down their commercial adoption at large-scale. Indeed, reducing the latency to meet the real-time requirement, while guaranteeing a good detection accuracy, represents a very challenging problem for the M-MIMO systems.

Thus, there is a need for a new approach that is capable of delivering the large amount of data with high accuracy and in real time, to avoid the problems mentioned above.

BRIEF SUMMARY OF THE INVENTION

According to an embodiment, there is a massive multiple-input multiple-output (M-MIMO) method for processing data. The method includes simultaneously receiving, at N antennas, a received signal (y), which corresponds to M data streams transmitted from M antennas, where N and M are natural numbers larger than 2; gradually generating a tree with M layers of nodes (P, $P_i$), which correspond, at the end, to all possible combinations of symbols included in the received signal (y); dividing the tree into plural subtrees; simultaneously calculating, (1) with a master processor, distances between the received signal (y) and leaf nodes (P) of the tree, along a subtree of the plural subtrees, using a first approach, and (2) with plural slave processors, distances between the received signal (y) and other leaf nodes ($P_i$) of the tree, along corresponding subtrees of the plural subtrees, using a second approach, different from the first approach; and estimating a transmitted signal (s) transmitted by the M antennas, based on a smallest distance corresponding to the leaf nodes (P) and the other leaf nodes ($P_i$). The transmitted signal (s) is a vector having M components and the received signal (y) is a vector having N components.

According to another embodiment, there is a massive multiple-input multiple-output (M-MIMO) system that includes N antennas configured to simultaneously receive a received signal (y), which corresponds to M data streams transmitted from M antennas, where N and M are natural numbers larger than two; a master processor configured to gradually generate a tree with M layers of nodes (P, $P_i$), which correspond to all possible combinations of symbols included in the received signal (y); the master processor also being configured to divide the tree into plural subtrees, and calculate distances between the received signal (y) and leaf nodes (P) of the tree, along a subtree of the plural subtrees, using a first approach; and slave processors configured to calculate, simultaneously with the master processor, distances between the received signal (y) and other leaf nodes ($P_i$) of the tree, along corresponding subtrees of the plural subtrees, using a second approach, different from the first approach. The master processor is configured to estimate a transmitted signal (s) transmitted by the M antennas, based on a smallest distance corresponding to the leaf nodes (P) and the other leaf nodes ($P_i$), and the transmitted signal (s) is a vector having M components and the received signal (y) is a vector having N components.

BRIEF DESCRIPTION OF THE DRAWINGS

For a more complete understanding of the present invention, reference is now made to the following descriptions taken in conjunction with the accompanying drawings, in which:

FIG. 1 is a schematic diagram of a massive MIMO system;

FIG. 3 schematically illustrates the SD algorithm;

DETAILED DESCRIPTION OF THE INVENTION

Figure 2:
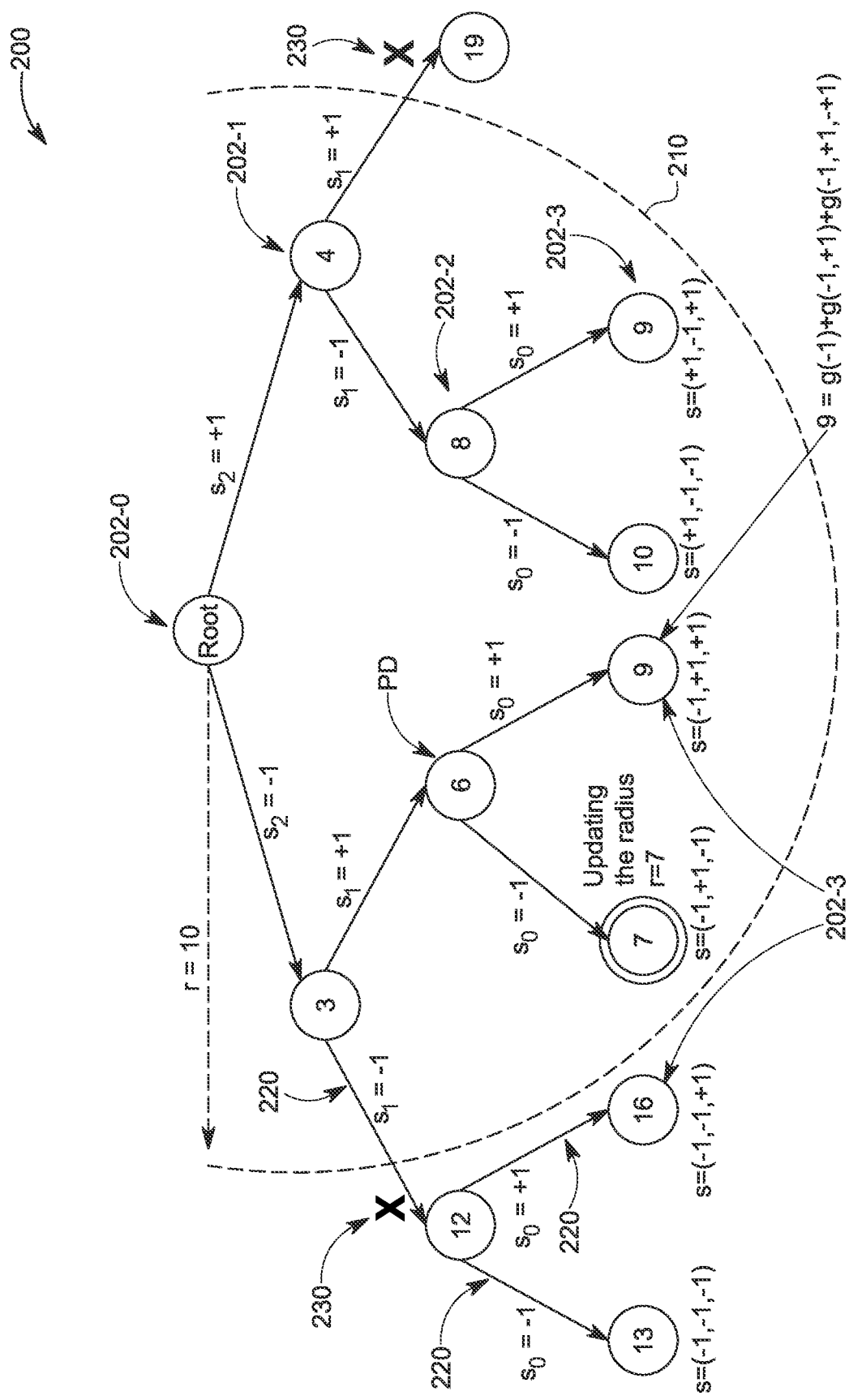
FIG. 2 represents a tree searched by the SD algorithm for a MIMO system.

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, the massive MIMO scaling challenge discussed above is addressed by adapting the SD algorithm to achieve both decent BER performance and acceptable time complexity. To this end, the embodiments discussed next are focusing around a couple of aspects, which can be combined in any desired way as now discussed.

The first aspect relates to revisiting the SD sequential algorithm and optimizing the time complexity of its main components. The SD algorithm operates on a search tree, where leaf nodes (i.e., the last nodes of the tree) represent all possible combinations of the transmitted vector. Its goal is to find the combination (leaf node) with the minimum distance from the received signal. Two aspects of this algorithm are considered by the embodiments discussed herein: (1) how to efficiently explore the search tree, i.e., which node to select first, and (2) how to optimize the evaluation process, i.e., the process of computing the distance of each search tree node from the received signal. One or more embodiments discuss and evaluate the impact of different exploration strategies on the complexity of the SD algorithm, namely: Breadth-First Strategy (BFS), Depth-First Strategy (DFS), and Best-First Strategy (Best-FS). The complexity of the SD algorithm is reduced in one embodiment by reformulating the evaluation process in terms of matrix algebra to increase the arithmetic intensity. In another embodiment, an incremental evaluation is introduced in order to avoid redundant computations. The idea in this embodiment is to compute the evaluation of a current node by reusing the evaluations of its previous parent node. By choosing Best-FS as the optimal exploration strategy and performing these two aforementioned optimization techniques, the complexity of the sequential SD algorithm is significantly reduced, while maintaining an optimal error rate performance.

The second aspect relates to accelerating the sequential SD algorithm by using parallel multicore CPU architectures. In one embodiment, the proposed parallel implementation relies on the master/worker paradigm. It exploits the fact that each path in the SD search tree can be explored in a parallel fashion. Indeed, the search tree may be recursively divided into several smaller search trees where each one is explored by an instance of the SD. Several instances of the SD algorithm may simultaneously explore the search tree, i.e., one instance of the SD algorithm operating as a master process and the others as workers. This parallel version aims to diversify the search process, which may rapidly reduce the radius and thus, the complexity. This method, called herein diversification gain, allows to avoid the serial exploration of a large number of branches. However, due to the irregular workload on each path, the parallel implementation may run into a load balancing problem, which may affect its parallel scalability. To overcome this drawback, an efficient dynamic load balancing strategy is introduced in one embodiment, which adjusts the workload per thread at runtime. The proposed parallel approach using this new load balancing strategy reports more than 5× speedup compared to a recent work from Nikitopoulos et al. (Nikitopoulos, K., Georgis, G., Jayawardena, C., Chatzipanagiotis, D., and Tafazolli, R., Massively parallel tree search for high-dimensional sphere decoders, IEEE Transactions on Parallel and Distributed Systems (2018)) on a similar 10×10 16-QAM MIMO configuration. It also achieves up to 60× speedup compared to the serial SD version using a 16-QAM modulation on a two-socket 10-core Intel Ivy Bridge shared-memory platform (i.e., 20 cores total). This represents a super-linear speedup, which has been possible thanks to the diversification gain. It turns out that even when using parallelism, the complexity of the SD algorithm may still be very high to deal with larger MIMO systems and constellation sizes.

To further reduce the complexity of the algorithm, the third aspect involves a trade-off between the complexity and the performance, via a new hybrid implementation combining the strengths of the novel parallel SD and the K-best algorithms. According to this implementation, called herein SD-K-best, the purpose is to accelerate the exploration of the SD search tree stored on the master process by using several workers that use the low-complexity K-best algorithm. This approximate method permits to explore rapidly and partially the subtree sent by the master, which effectively reduces the complexity. The selected nodes (i.e., branches/paths) are chosen according to their partial distance from the received signal. Thus, they are more likely to contain good solutions and may eventually ensure a satisfactory BER.

The synergistic SD-K-best implementation integrates all the benefits of the parallel SD algorithm (i.e., diversification gain, Best-FS, and sphere radius) to increase the chances of encountering good combinations of the transmitted signal, while effectively reducing the complexity using the parallel SD implementation associated with the K-best algorithmic strengths. The obtained results of the novel SD-K-best implementation show an overall low complexity and good performance in terms of BER, as compared to the reference K-best algorithm. For a 16×16 MIMO system using 64-QAM modulation, the novel SD-K-best approach reaches an acceptable error rate at a 20 dB SNR and a real-time requirement (i.e., 10 ms) starting from 28 dB. In one application, the SD-K-best approach shows a strong scalability potential by reporting acceptable complexity and good error rate performance fora 100×100 MIMO system using 64-QAM modulation. To the inventors' knowledge, such a record has never been achieved previously in the literature. The aspects summarized above are now discussed in more detail.

Before discussing the novel aspects of the invention, revisiting the fundamentals of the serial SD algorithm is believed to be in order. The serial SD algorithm stands as a proxy for all non-linear decoders. The time complexity of this algorithm can be reduced by relying on a new Best-First Strategy (Best-FS) for efficient exploration, a matrix algebra reformulation for increasing arithmetic intensity, and an incremental evaluation process for cutting down the number of operations. These optimizations are performed for all SNR regions allowing to reduce the time complexity, while maintaining optimal BER performance. The sequential implementation is then extended by exploiting the inherent parallelism of the SD algorithm. The diversification gain is used to avoid the exploration of a larger number of branches explored in the serial version. A dynamic load balancing scheduler that minimizes idleness, communications, and synchronization overhead is then added. Finally, in order to break the symbolic barrier of hundreds of antennas for the first time, one embodiment deploys a new hybrid approximate approach that blends the aforementioned strengths of the SD implementation with the ones from the K-best algorithm. This new SD-K-best CPU-based implementation achieves performance and complexity metrics at unprecedented levels from the literature, even with GPU hardware accelerators.

For the purpose of this application, a baseband MIMO system 100 having M transmit antennas 102 and N receive antennas 104 is shown in FIG. 1. A transmitter 114 sends M data streams 110 simultaneously to a receiver 116 using multiple antennas 102 via a flat-fading channel 120, described by a matrix H. The receiver 116 receives N streams 112 at the N antennas 104. This system is described by the input-output relation described by equation (1), where all bold characters indicate a vector or a matrix, and the other indicate a scalar:

$$y = Hs + n, \quad (1)$$

where the vector $y=[y_1, \ldots y_N]^T$ represents the received signal, H is the N×M channel matrix, where each element $h_{ij}$ is a complex Gaussian random variable that models the fading gain between the j-th transmitter and the i-th receiver, the vector $s=[s_1, \ldots s_M]$ represents the transmitted vector, and $s_i$ belongs to a finite alphabet set denoted by $\Omega$. The vector $n=[n_1, \ldots n_N]^T$ represents the additive white Gaussian noise with zero mean and covariance $I_N$, where $I_N$ designates the identity matrix of size N. For convenience, S is considered to be a set of all possible combinations of the transmitted vector s. The possible number of combinations corresponds to the complexity of the MIMO system and it is calculated as follows: $|S|=|\Omega|^M$.

There are two options to decode the received signal y. Either use linear decoders characterized by low complexity and poor performance in terms of BER, or use non-linear (optimal) decoders characterized by good BER quality, but high complexity.

Linear decoders multiply and map the received signal y using a matrix denoted by $H_{inv}$(M×N), obtained from the channel matrix H. The most commonly used linear decoders in the literature define $H_{inv}$ as follows:

Maximum Ratio Combining (MRC), where $H_{inv}=H^H$,

Zero Forcing (ZF), where $H_{inv}=(H^H \cdot H)^{-1} \cdot H^H$, when M≤N, and

Minimum Mean Square Error (MMSE), $$H_{inv} = \left(H^H \cdot H + \frac{1}{SNR} \cdot I_m\right) \cdot H^H,$$

with the SNR=P, where P is the average transmit power as the noise covariance is normalized to identity, without loss of generality.

For the non-linear decoders, the ML is the de facto decoder, exhibiting high complexity. It calculates a posteriori probability for each possible transmitted vector $s \in S$. In other words, the algorithm performs a brute-force exploration of the entire search space, as shown in equation (2):

$$\hat{s}_{ML} = \underset{s \in S}{\mathrm{argmin}} \|y - Hs\|^2. \quad (2)$$

The ML decoder chooses the vector s that minimizes the distance between the received vector y and the assumed transmitted vector Hs. In perfect conditions, i.e., in absence of noise, this minimum distance is equal to zero, which indicates that the transmitted vector is exactly the received one, up to a channel multiplication. Another example of a non-linear decoder is the SD algorithm. This decoder mimics the ML decoder, but limits the search for the candidate vector to a smaller space than the ML decoder, reducing the complexity of the algorithm. The SD algorithm explores solutions only inside a sphere of radius r set initially by the user, as shown in equation (3):

$$\|y - Hs\|^2 < r^2, \text{ where } s \in S. \quad (3)$$

The radius r may then be updated subsequently during the search process at runtime to further prune the search space and reduce the calculation complexity. The baseline SD algorithm and its components are now discussed in more detail.

The SD algorithm operates on a search tree that models all possible combinations of the transmitted vector s. This algorithm aims to find the best path in terms of distance from the received signal y, while ignoring non promising branches. Equation (3) can be translated in solving the integer least-square problem. It starts with a preprocessing operation by performing a QR decomposition of the channel matrix H as H=QR, where $Q \in C^{N \times M}$ is an orthogonal matrix and $R \in C^{N \times M}$ is an upper triangular matrix. This preprocessing step permits to expose the matrix structures of Q and R, which will be eventually used to simplify the computations. Indeed, by using the orthogonality of Q and considering only the M×M upper part of the matrix R, the problem defined in the equation (3) can be transformed into another equivalent problem as follows:

$$\|y - Hs\|^2 = \|y - QRs\|^2$$
$$= \|Q(Q^H y - Rs)\|^2$$
$$= \|Q^H y - Rs\|^2$$
$$= \|y' - Rs\|^2,$$

where

-continued $$\acute{y} = Q^H y = \left\| \begin{bmatrix} \acute{y}_0 \\ \acute{y}_l \\ \vdots \\ \acute{y}_{M-1} \end{bmatrix} - \begin{bmatrix} r_{00} & r_{01} & \cdots & r_{0M-1} \\ 0 & r_{11} & \cdots & r_{1M-1} \\ \vdots & \vdots & \cdots & 0 \\ 0 & 0 & \cdots & r_{M-1M-1} \end{bmatrix} \begin{bmatrix} s_0 \\ s_1 \\ \vdots \\ s_{M-1} \end{bmatrix} \right\|^2 .$$

Therefore, finding the supposed transmitted vector $\hat{s}$ in equation (1) is equivalent to solving the following minimization problem:

$$\min \sum_{k=1}^{M} g_k(s_{M-1}, \ldots, s_{M-k}), \quad (4)$$

where $g_k(s_{M-1}, \ldots, s_{M-k}) = \|\acute{y}_{M-k} - \sum_{i=M-k}^{M-1} (r_{M-k),i} s_i\|^2$. This latter formulation of the problem allows to model all possible combinations of the transmitted vector (i.e., the search space) as a search tree with M layers, as illustrated in FIG. 2. Note that FIG. 2 shows a tree 200 having plural nodes 202-I, where I varies between 0 and M. The tree is gradually generated. The 202-0 node is the root node, and all the other nodes belong to a given level. In FIG. 2, M=3, and thus there are three level of nodes below the root node 202-0. FIG. 2 further shows that only two symbols (+1, −1) are used for generating the received signal. In a practical implementation, any number of symbols may be used. Further, FIG. 2 shows a zone 210 described by the radius r, so that some of the nodes are inside the zone and some are outside. The last nodes 202-3 of the tree are considered to be the leaf nodes.

To find the path (from the root node to one leaf node) with the minimum distance from the received signal, the SD algorithm is decomposed into three components: branching, evaluation, and pruning. FIG. 2 illustrates the SD components on a MIMO system with 3 transit antennas using the Binary Phase-Shift Keying (BPSK) modulation and FIG. 3 schematically illustrates an implementation of the SD algorithm in software. The three components of the SD algorithm are now discussed in more detail with regard to FIGS. 2 and 3. Note that FIG. 3 shows the data that is received as input in block 302 for calculating the transmitted signal s. A list that describes the tree 200 is initialized at 304, with the root node 202-0. Next, at 306, each node P is used to generate its successors, i.e., to perform the branching part.

The branching component for a MIMO system with M transmit antennas is performed over the symbols of the transmitted vector. This process creates the search tree 200 with M levels, so that each level corresponds to one symbol. Thereby, the last level of the search tree (level 3 in FIG. 2) contains all possible combinations (they are listed in FIG. 2 next to each leaf node 202-3) of the transmitted vector s. Each search tree node 200-I is characterized by a set of fixed symbols denoted by F. In this way, there is no fixed symbols in the root node ($F_{root}=\emptyset$). The branching component is essentially a recursive process that divides the search space related to a search tree node P over several successors (or sub-problems) $P_i$, $i=1, \ldots, |\Omega|$. Each subsequent successor is eventually handled in the same way until a complete solution is found, i.e., until the number of symbols in the solution is equal to M (note that M=3 in FIG. 2). The number of immediate successors depends on the size of the alphabet (only two letters "−1" and "+1" are used in FIG. 2 for the constellation in the BPSK modulation). For this specific case, there are only two immediate successors ($P_1$, $P_2$) of a node P, where $P_1$ is characterized by the set $F_{P_1}=F_P \cup \{-1\}$ and $P_2$ is characterized by the set $F_{P_2}=F_P \cup \{+1\}$. At each level I of the search tree 200, the branching is performed over one symbol. Because the matrix R from the QR decomposition is upper triangular, each level I of the search tree 200 corresponds to a symbol $s_{M-1}$. For example, level 1 corresponds to symbol $s_{M-1}$ and level M corresponds to symbol $s_0$. Thus, the algorithm initially fixes $s_{M-1}$, then symbol $s_{M-2}$, and so on, until reaching the leaf nodes where the last symbol $s_0$ is fixed.

The evaluation part of the SD algorithm represents the process of computing the Partial Distance (PD) of each searched tree node from the received signal. The evaluation part, denoted by E in the algorithm illustrated in FIG. 3 (see line 308), is calculated for each successor using equation (4). More precisely, the evaluation of a search tree node P characterized by L fixed symbols ($F_P=\{s_{M-1}, \ldots, s_{M-L}\}$) is defined as $E(P)=\sum_{k=1}^{L} g_k(s_{M-1}, \ldots, s_{M-k})$. This expression is equivalent to:

$$E(P) = \left\| \begin{bmatrix} \acute{y}_{M-L} \\ \cdot \\ \cdot \\ \acute{y}_{M-1} \end{bmatrix} - \begin{bmatrix} 0 & \cdots & r_{M-L}, r_{M-2} & r_{M-L}, r_{M-1} \\ \cdot & \cdot & \cdots & \cdot \\ \cdot & \cdot & \cdots & \cdot \\ 0 & 0 & 0 & r_{M-L}, r_{M-1} \end{bmatrix} \begin{bmatrix} s_{M-L} \\ \cdot \\ \cdot \\ s_{M-1} \end{bmatrix} \right\|^2 .$$

This means that only the last L elements in the vector $\acute{y}$ and the last L lines in the matrix R are used to compute the evaluation of a node P with L fixed symbols where $L=|F_P|$.

The pruning part of the algorithm defines the region 210 in FIG. 2 of the search space in which an intelligent enumeration can be performed. The radius r represents an important parameter for determining the complexity of the SD algorithm, because a large value of the radius r determines a high complexity. The ideal value for the radius should as small as possible, but as long as the corresponding region still includes the ML solution. The sphere radius r imposes an upper limit for the expression $\|\acute{y}-Rs\|^2$, which leads to reject any partial combinations of the transmitted vector s with a partial evaluation greater than r. The sphere radius used in this embodiment is equal to $$r^2 = N \cdot M \cdot 10^{\frac{-SNR}{10}}$$

and is shown as being 10 in FIG. 2.

The pruning process consists in detecting and eliminating the unpromising branches 220 in the search tree 200 by using both the sphere radius r and the evaluation PD of the nodes P. As seen in equation (4), the evaluation PD increases each time a new symbol is fixed in the transmitted vector s. This means that a node P with a partial evaluation $E(P) \geq r^2$ cannot lead to a complete solution that improves the best one already found. In this specific case, the node P is eliminated, as illustrated by step 230 in FIG. 2. To ensure an efficient pruning process during the search, in one embodiment, the value of the radius is replaced each time a new better solution (leaf node) $s \in S$ is explored, i.e., $r^2=E(s)$. Updating the value of the radius during the pruning phase is advantageous for the subsequent explorations of the search tree. This feature may prevent spending a lot of resources on a large number of branches that are outside of the sphere radius.

Figure 4A:
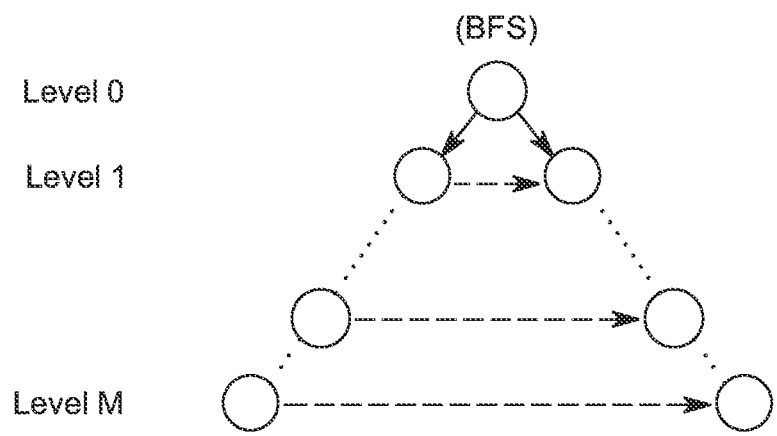
FIGS. 4A and 4B illustrate traditional exploration strategies used by the SD algorithm while FIG. 4C illustrate a novel exploration strategy.
Figure 4B:
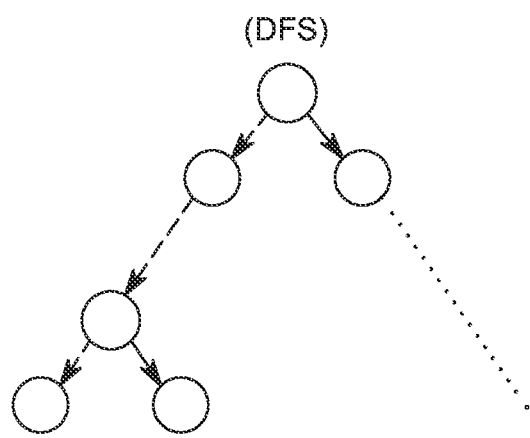
Figure 4C:
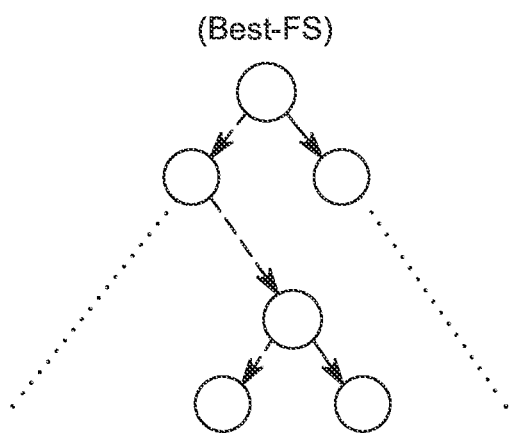

To exploration phase of the SE algorithm can be very time and resource intensive. To give an idea about the magnitude of the search space, the number of combinations (leaf nodes) for a MIMO system with the BPSK modulation and fifty transmit antennas is $1.1258999\ e^{+15}$. Exploring all these possibilities under real-time constraints is prohibitively expensive. The exploration strategies for the SD algorithm define the way the search tree is explored and traversed, as illustrated in line 310 in FIG. 3. The performance of each exploration strategy depends on the MIMO configurations and the underlying hardware architectures. The SD search tree is stored using a list structure and is partially explored at each iteration. FIGS. 4A and 4B schematically illustrates two typical ways of exploring a tree: Breadth-First and Depth-First, and FIG. 4C illustrates a novel way, which is called herein Best First Strategy (Best-FS).

The BFS explores the search tree 200 level by level, which means that all nodes of a given level must be explored before moving toward the lower levels, as indicated by the arrows in FIG. 4A. In practice, implementing the BFS consists to apply a First-In First-Out (FIFO) strategy on the data list that contains the tree, i.e., selecting always the rightmost node in the list. The BFS is particularly suitable for parallel implementations since all the nodes of a given level can be treated independently. This enables to efficiently exploit the available computing resources. However, its major drawback is the high memory footprint during the search process. This makes its application limited in practice, especially for massive MIMO systems where the number of possible solutions may be very large. A second major drawback of the BFS strategy is the fact that the sphere radius remains the same throughout the search process, because this strategy reaches the leaf nodes only at the last level. The static sphere radius cannot be updated at runtime and engenders a poor pruning process, which induces a very high complexity even for small MIMO systems.

The DFS is a recursive process based on a backtracking technique. Unlike the BFS, the DFS aims to reach leaf nodes as quickly as possible by exploring down the current path as indicated by the arrows in FIG. 4B. Once it reaches the leaves, the DFS may explore the tree backward to retrieve new nodes and carry on again along the new path until attaining the bottom of the tree. This process is pursued until all nodes are explored. In practice, implementing the DFS consists in applying a Last-In First-Out (LIFO) strategy to the data list that contains the tree. In other words, the DFS always selects the leftmost node in the list, which is the most recently added to the list after the branching process. It is noted that the DFS is characterized by a limited memory usage. This feature makes it very suitable in practice for challenging problems such as decoding messages in massive MIMO systems. It is also noted the possibility of dynamically updating the value of the sphere radius due to the large number of entirely explored solutions. For example, it is possible to dynamically adjust the radius r by ordering the nodes in the tree based on the calculated distances (see FIG. 2) and selecting a new value (see new value 7 in FIG. 2) of the radius by taking a smallest distance of a node in a given level. Alternatively, a new value of the radius is selected by taking a smallest distance of the nodes in a last level of a subtree of the master processor and a subtree of the slave processor. Although the complexity may be improved for sequential implementations, the DFS does not expose parallelism compared to BFS. Therefore, it may not be suitable in the presence of a high number of computing resources needed to operate large MIMO configurations.

To improve the search tree exploration, according to this embodiment a novel Best-FS is introduced. This strategy is similar to the DFS since both are meant to explore the leaf nodes first. However, the Best-FS targets a better quality of leaf nodes (in terms of the distance from the received signal) as compared to the DFS exploration model. After the branching process, the Best-FS chooses first the node with the best evaluation in order to complete its exploration. A major difference with regard to the DFS model is that the nodes generated after the branching process are sorted according to their partial distance before being inserted into the list. Because the number of the nodes generated after the branching is limited, the overhead time of the sorting process is insignificant. The exploration based on the Best-FS is theoretically more suited for SD implementation because it targets better quality leaf-nodes. Therefore, this approach proactively reduces the sphere radius throughout during the SD process, which decreases the number of explored nodes and thus, the memory footprint and the arithmetic complexity.

After optimizing the exploration phase, it is possible to further reduce the SD complexity by optimizing its evaluation phase. This latter phase represents the most time-consuming part of the SD algorithm, because it is calculated for each search tree node. To achieve this goal, two aspects are considered herein: reducing the number of evaluation steps and avoiding redundancy in the evaluation process.

Figure 5:
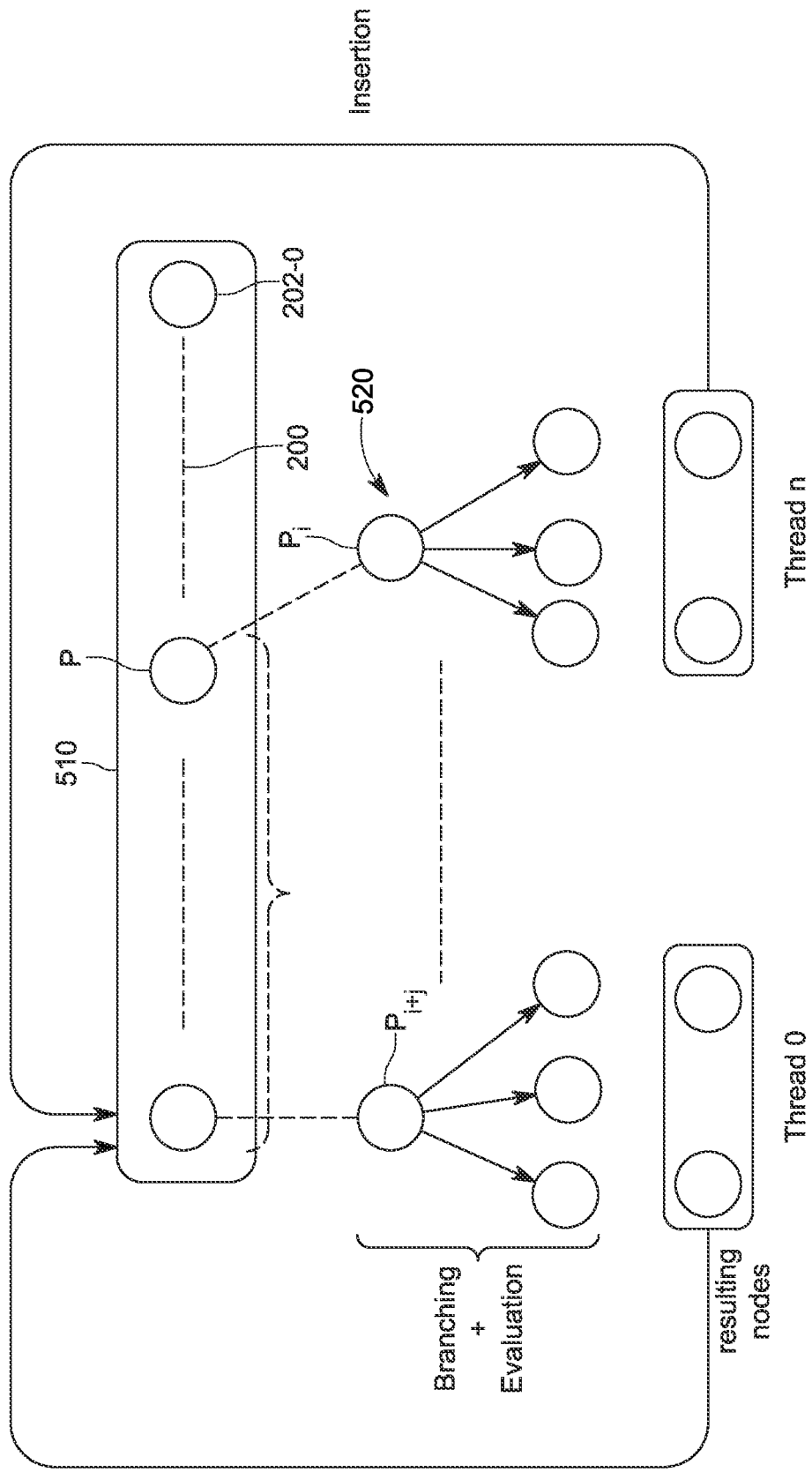
FIG. 5 illustrates a low-level SD parallelization approach.

To reduce the number of evaluation steps, it is possible to reduce the number of intermediate evaluation points for each path in the search tree. For a MIMO system with M transmit antennas, the SD algorithm generally performs M evaluation points to reach the leaf nodes, which may be overwhelming when scaling up massive MIMO systems. Reducing the number of evaluation points can be achieved by performing the branching process simultaneously over several symbols instead of one at a time. In this regard, note that the example shown in FIG. 2 performs the evaluation points for one symbol at a time, i.e., when moving from one level to the next level only one symbol so is added. However, according to this embodiment is it possible to perform the branching over J positions in the transmitted vector, as illustrated in FIG. 5, which allows to reduce the number of evaluation points from M to M/J. For instance, performing the branching over five symbols at a time for a MIMO system with 100 transmit antennas will reduce the number of evaluation points for each search tree path from 100 to only 20. Beside shortening the overall processing time of the evaluation phase, this grouping technique allows to reach the leaf nodes more quickly than the other techniques, which may result not only in reducing the latency overhead, but also in pruning earlier a large number of branches.

However, the number of immediate successors will increase according to the number of the fixed symbols in the branching process. Therefore, instead of creating $|\Omega|$ new successors, this approach creates $|\Omega|^J$ new successors. The parameter J should be tuned accordingly to trade-off complexity and parallelism.

Because the search tree 200 for a massive MIMO system may be very large, it is desirable to optimize the evaluation in order to achieve a good performance. This step is called herein incremental evaluation. To further reduce the complexity of the evaluation step, according to this embodiment, redundant computations are suppressed as now discussed. The evaluation of a search tree node P with L fixed symbols is equal to $E(P)=\Sigma_{k=1}^{L} g_k(s_{M-1}, \ldots, s_{M-k})$. It can be seen that the complexity of the evaluation increases significantly when moving toward the leaf nodes. To avoid this increase in complexity and to have the same evaluation time for all search tree nodes, according to this embodiment, the incremental nature of the evaluation process for this problem is considered. Indeed, the evaluation of the successors $P_i$ of the node P with $L_i$ fixed symbols, where $L_i > L$, can be decomposed as follows:

$$E(P_i) = \sum_{k=1}^{L_i} g_k(s_{M-1}, \ldots, s_{M-k}) \quad (5)$$

$$= \underbrace{\sum_{k=1}^{L} g_k(s_{M-1}, \ldots, s_{M-k})}_{E(P)} + \underbrace{\sum_{k=L+1}^{L_i} g_k(s_{M-1}, \ldots, s_{M-k})}_{non-compliantpart}.$$

Based on equation (5), it is possible to store the calculations (E(P) part) during the evaluation of the previous node P to use it later, when evaluating the successors of the node P. In this way, the evaluation process for all the search nodes needs to compute only the non-computed part of equation (5), as the other part is reused from the previous nodes. Thus, the incremental evaluation step speeds up the evaluation process.

The SD algorithm may be further improved by implementing sequential and parallel treatment of the algorithm based on the Best-FS technique combined with the grouping and incremental evaluation steps discussed above. The serial implementation of the SD algorithm is based on optimizing the evaluation phase using the Basic Linear Algebra Subprograms (BLAS). As discussed above with regard to FIG. 2, performing the branching over J symbols at a time allows to reduce the number of evaluation steps. However, this approach also increases the number of successors from $|\Omega|$ to $|\Omega|^J$. Each successor is characterized by a vector of fixed symbols called here υ. To evaluate all successors at once, this embodiment takes the following approach: regroup all successors' vectors in one matrix named V, with |υ| lines (number of fixed symbols) and $|\Omega|^J$ columns (number of successors). After that, create a matrix R' by considering only the last |υ| lines and the last |υ| columns of the matrix R. Next, the BLAS library [4] is used to compute the matrix B=Y*−R'V, where Y* represents the last |υ| elements of ý duplicated by $|\Omega|^J$ times. The matrix B is then used to deduce the evaluation of each successor by computing the norm over the columns of the matrix. In this way, it is possible to optimize the implementation of this algorithm.

However, searching for the optimal combination of the transmitted vector is a time consuming operation due to the large scale of the SD search tree. Therefore, the impact and possible gain of exploiting the processing elements of a single workstation are now considered. Most of the modern machines are parallel from a hardware perspective, i.e., they offer a decent computing power, which is not exploited in most cases. For this reason, and to evaluate the possible gain that can be achieved using a small number of computing resources, two parallel SD approaches are now discussed: a low-level parallel SD approach and a high-level parallel SD approach.

The low-level parallel SD approach attempts to accelerate the SD algorithm by accelerating its exploration phase. As depicted in FIG. 5, this first approach aims to accelerate the sequential process of exploring one search tree 200 stored in a list 510. At each iteration I, the serial SD algorithm takes a search tree node P from the list 510 and performs the branching operation 520, which creates a set of successor nodes $P_i$. After that, the SD calculates the partial distance (evaluation) for all resulting nodes $P_i$ before adding them to the list 510. The idea of this parallel approach is to perform the branching over several nodes $P_i$ to $P_{i+j}$ at the same time. Therefore, at each iteration of the SD algorithm, a set of threads Thread n to Thread 0 are created to perform the same sequential process (branching and evaluation) over several search tree nodes in a concurrent safe way. This process is repeated until the list 510 becomes empty. Hence, the end of the parallel algorithm is reached. The number of threads and work-load for each one is adapted to the number of processing elements available in the machine. Moreover, to ensure low memory utilization, this approach uses the Best-FS exploration model.

An advantage of this approach is the fair work-load distribution between the parallel threads, which prevents the idleness especially for this kind of problems. The downside of this approach is the scalability issue that may occur when increasing the number of parallel threads, due to the concurrent access to the same data-structure. To avoid this problem, a second parallel SD approach is now discussed.

Figure 6:
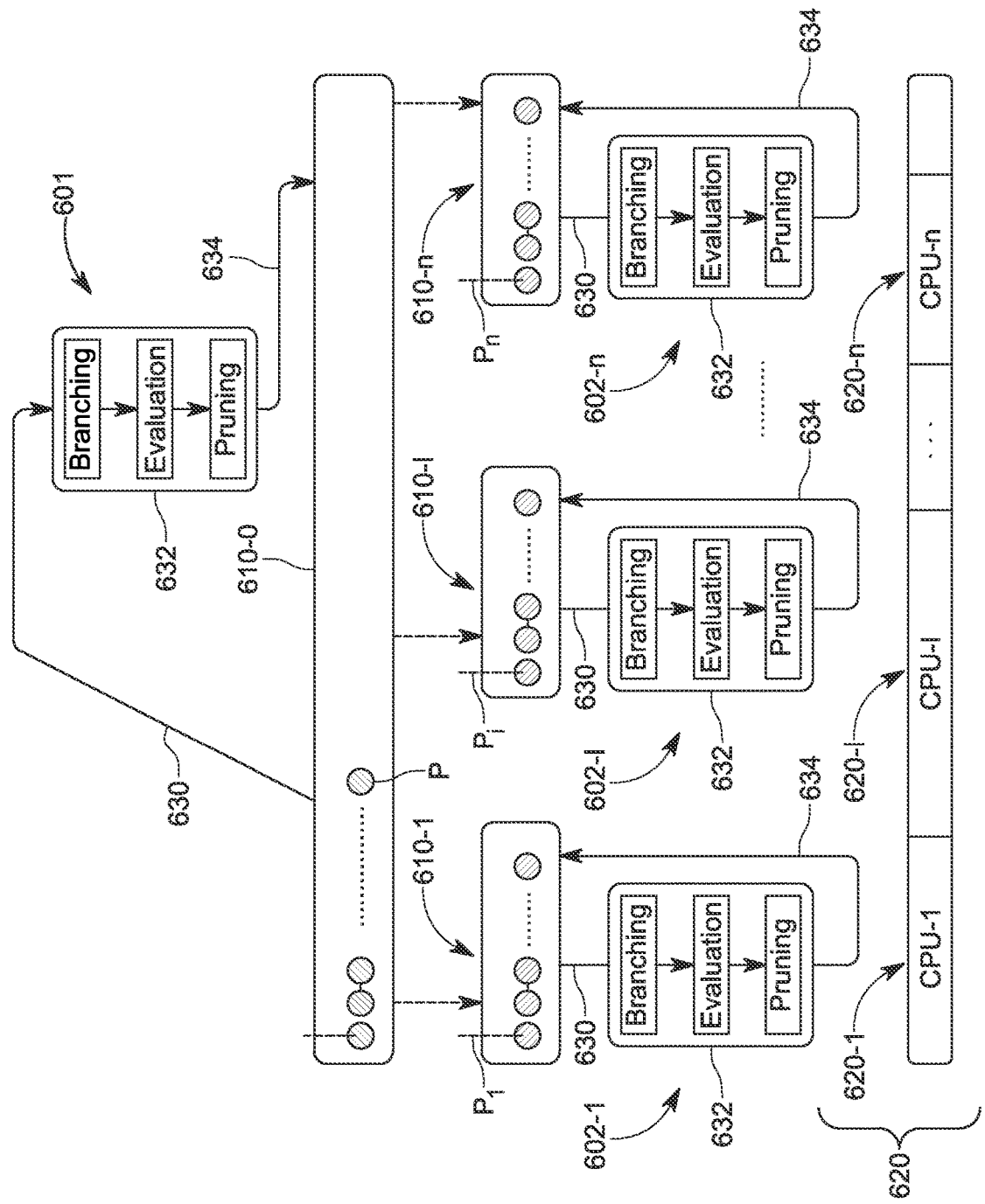
FIG. 6 illustrates a high-level SD parallelization approach.

As depicted in FIG. 6, the second parallel approach, i.e., the high-level parallel SD approach, has a high-level of parallelization in which several instances 602-I of the SD algorithm explore simultaneously the search space. In this embodiment I is a natural number that varies up to a value n. Indeed, this scheme exploits the fact that the global tree 200, which models all possible combinations of the transmitted vector, can be divided into several smaller subtrees 610-I, where each subtree can be explored independently from the other subtrees. The only shared information between the SD instances 602-I is the value of the sphere radius, which is updated each time a new better solution is explored by parallel threads.

This novel parallel scheme, which exploits the multi-core CPU processors 620-I of a computing device 620, is based on the Master/Worker paradigm. According to this paradigm, one instance 601 of the SD algorithm is playing the role of the master process and the other SD instances 602-I are playing the role of the workers. The master 601 divides the search tree 200 into several sub trees, which are meant to be explored by the workers 620-I. A set of active nodes generated by the SD algorithm during the search process are considered to form a work-pool 610-I. Two kind of work-pools can be identified: a master-pool 610-0 owned by the master process, and several local work-pools 610-I owned by the different workers. Initially, all workers are blocked, waiting for nodes to be explored. The master 601 creates the root node and begins the exploration of the search tree, which generates a set of nodes P in the master-pool 610-0. When the number N of nodes in the master-pool 610-0 is greater than the number n of workers 620-I, the master 601 wakes up the blocked workers by sending to each one of them a node $P_i$ (subtree). After that, each worker 620-I launches its own SD instance 602-I to explore the sub-tree related to the received node $P_i$. In order to efficiently reduce the sphere radius r, all parallel SD instances (threads) explore their subsequent subtree according to the Best-FS model. The master periodically checks on the state of workers and wakes-up any blocked one (worker with an empty work-pool). Each time the master-pool is empty, the master checks the state of all workers. If all of them are blocked, the master sends an end signal to all parallel threads. FIG. 6 shows how each master/worker selects in step 630 a node from the corresponding work-pool, branches, evaluates and prunes the corresponding sub-tree in step 632, and then inserts the generated nodes into the corresponding sub-tree in step 634.

Due to the prohibitive complexity of the SD algorithm, and the irregular work-load in the SD sub-trees, a load-balancing strategy is implemented in this embodiment. This strategy has an objective to increase the efficiency of the high-level parallel SD approach by avoiding the idleness of the workers. In this embodiment, the idleness of the workers appears only in the case where the master work-pool 610-0 is empty. A way to avoid the idleness of the workers is to perform a workload redistribution over all blocked workers whenever the master work-pool is empty. In this case, the master 601 locates the worker which has the highest number of unexplored nodes. Then, it distributes these nodes over the blocked workers and moves most of the remaining nodes to its own work-pool. In this way, the process is able to ensure a fair work-load distribution during the decoding process.

The parallelization approach discussed with regard to FIG. 6 allows to speed up the exploration process and reduce the SD algorithm's complexity. However, the complexity of the SD algorithm is still very high to deal with massive MIMO systems under real-time constraints. For this reason, this embodiment implements a new approximate algorithm that perform a trade-off between the complexity and the performance in terms of error rate of the SD algorithm.

Figure 7:
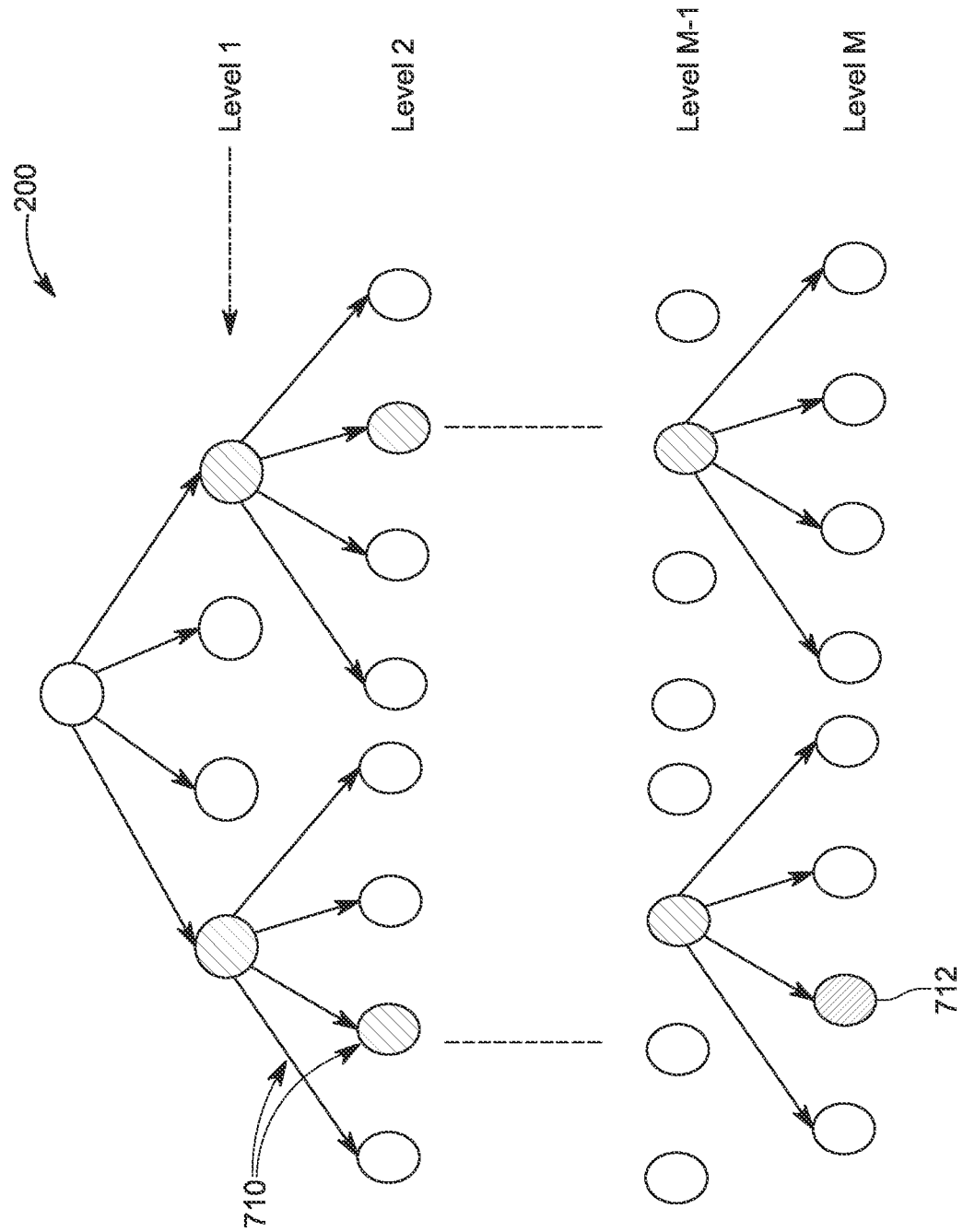
FIG. 7 illustrates a K-best algorithm for K=2.

The approximate approach aims to achieve an acceptable BER in real-time complexity, i.e., losing a bit in performance (as compared to the SD algorithm), but gaining in terms of complexity. The challenge is to find the appropriate balance to achieve both near ML performance and real-time response. In this regard, one of the best algorithms performing a trade-off between the complexity and the performance is the K-best algorithm [5]. Similarly to the SD algorithm, the K-best algorithm operates on a search tree that models all possible combinations of the transmitted vector, as illustrated in FIG. 7. It explores the search tree level 200 by level according to the BFS model. However, the algorithm keeps at each level only the best K nodes 710 in terms of evaluation for further exploration, and the remaining nodes from each level are systematically removed. This process is repeated for each level until reaching the last one where leaf nodes 712 (solutions) exist. Among these solutions, the algorithm returns the best one in terms of its distance. Because the search tree of this algorithm contains K nodes in each level, the total number of explored nodes by this algorithm is equal to (M−1)×K, where M refers to the number of transmit antennas. Thereby, this algorithm has a fixed complexity irrespective of the SNR.

Moreover, the number K of kept nodes 710 should be carefully considered as they impact the complexity of the algorithm. On one hand, a large value of the parameter K allows the algorithm to achieve a near SD performance in terms of BER. However, the algorithm complexity increases significantly and can even exceed the SD complexity. In addition to that, a large value of K induces a significant sorting overhead, making the complexity of K-best far from the real-time response. On the other hand, a small value for parameter K reduces the complexity; however, the algorithm loses in performance in terms of BER. Moreover, the performance of the algorithm, in terms of BER, drops significantly for dense constellations.

To overcome all these drawbacks, this embodiment uses a hybrid parallel algorithm, named SD-K-best, which takes the benefits of the SD and K-best algorithms. This hybrid approach also aims to reduce the complexity of the high-level parallel SD version illustrated in FIG. 6, while taking benefit from the Best-FS exploration illustrated in FIG. 4C, the sphere radius, and the diversification gain.

This hybrid approach is based on the high-level parallel scheme of FIG. 6, which means that a Master/Worker paradigm is also used in this approximate approach. The master process executes the SD instance which builds the SD search tree in the master work-pool 610-0. To accelerate the exploration process of this tree, several workers 620-I use the low-complexity K-best algorithm. In other words, the master 601 performs the pre-processing phase and generates the root of the SD search tree. After that, it explores the search tree by a SD algorithm according to the Best-FS exploration mode which allows to explore first the most promising combinations. To accelerate the exploration process, the master sends to the workers 620-I, from the head of the master work-pool 610-0 (right-most nodes), for workers to complete their exploration. Each worker 620-I explores the received node by using the K-best algorithm. Therefore, after the branching 632, the worker 620-I keeps only the best K successors in terms of the partial distance and ignores the rest of the nodes, which substantially reduces the complexity of the algorithm. In one application, in addition to the best K nodes selected by each worker, additional nodes may also be selected if their distance is very close to the distance of the selected nodes. Moreover, because the value of the parameter K used by each worker is small, there is an insignificant sorting overhead which allows workers to rapidly reach leaf-nodes and improve the radius. Improving the radius allows to even more reduce the complexity experienced by the workers. i.e., the workers keep only the best successors which are inside the radius. This allows to better target quality combinations. In the case where the nodes kept by a worker are outside the radius, the corresponding worker ends its exploration and requests a new node from the master. The fact that the search tree is built in parallel allows to take benefit from the diversification gain, which may allow to explore good combinations and thus, reduce more efficiently the radius and avoid the explorations of a large number of branches. The end of this hybrid approach is reached when the master work-pool is empty.

The overall number of the explored nodes by the hybrid SD-K-best algorithm is much bigger than the number of explored nodes by the K-best algorithm, which leads to improvements of the BER performance. However, since this approach takes benefit of the parallel architectures discussed with regard to FIG. 6, the complexity of the hybrid SD-K-best algorithm can be less than the complexity of the K-best algorithm, because the average number of the explored nodes by a single processing element is lower. In this way, according to this embodiment, it is possible to achieve both a low complexity and a good BER performance as now discussed.

The inventors have tested the algorithms discussed above on a system having a two-socket 10-core Intel Ivy Bridge CPU running at 2.8 GHz with 256 GB of main memory. Hyper-threading is enabled on the system in order to maximize resource occupancy. For all the experiments, it is considered the case of a perfect channel-state information. This means that the channel matrix is known only at the receiver.

The impact of using parallel architectures on the SD complexity is now discussed. Two parallel approaches have been discussed above, one with regard to FIG. 5 and the other one with regard to FIG. 6. The first parallel approach (PL-SD) uses a set of threads to explore several nodes at a time while the second parallel approach (PSD) uses simultaneously several instances of the SD algorithm to explore the search tree in parallel. Due to the unbalanced work-load for each instance, two versions of the PSD are proposed depending on the nature of the used load-balancing strategy: PSD with static load-balancing (S-PSD) and PSD with dynamic load-balancing (D-PSD). In the PL-SD approach, creating and destroying threads at each iteration induces a considerable overhead time, which slows down considerably this parallel version. To overcome this problem, the workload for each parallel thread needs to be high enough to cover this overhead time. In this case, the workload for each thread is around twenty nodes.

Figure 8:
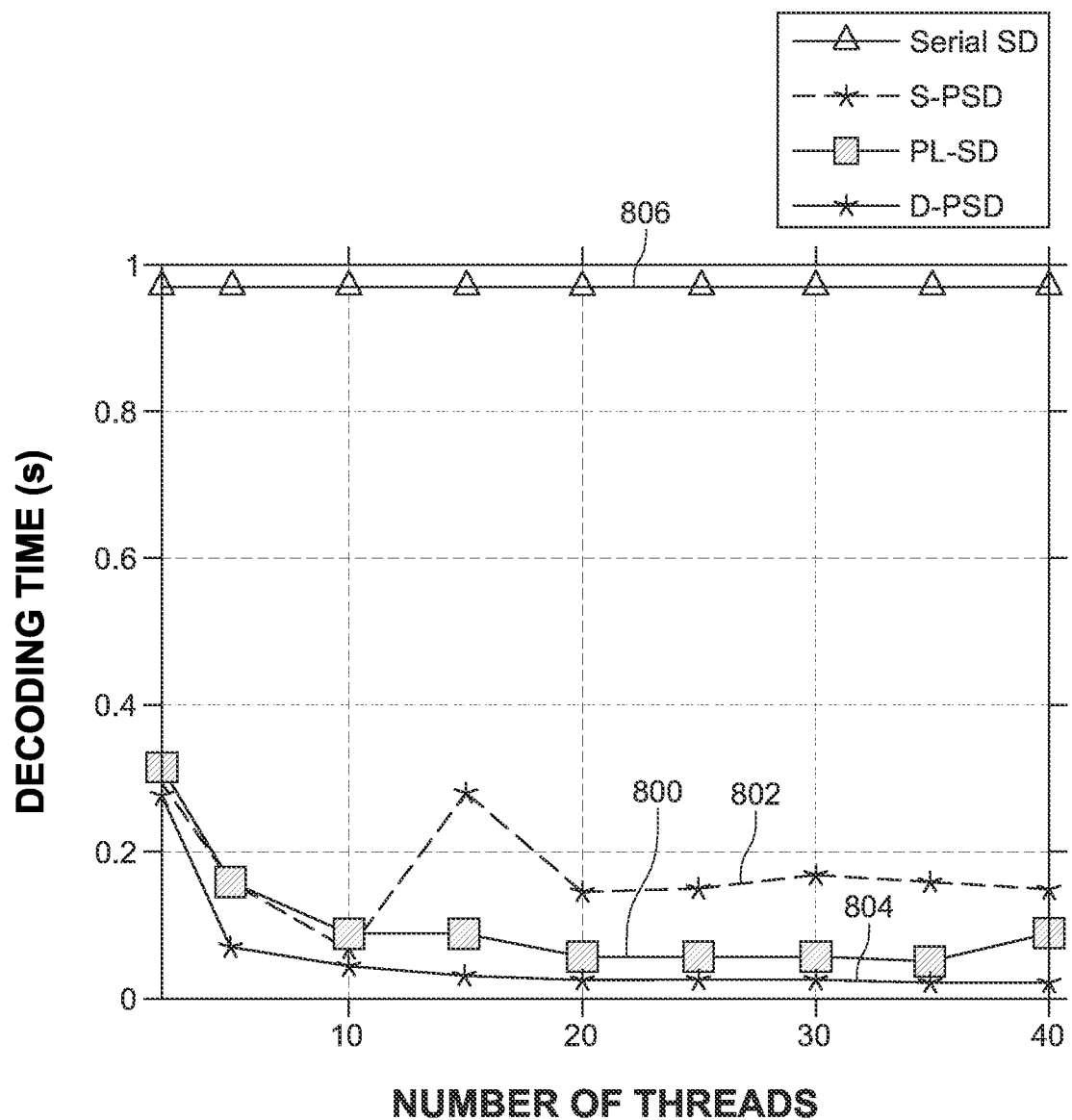
FIG. 8 illustrates the complexity results for the SD approach with various exploration strategies.
Figure 9:
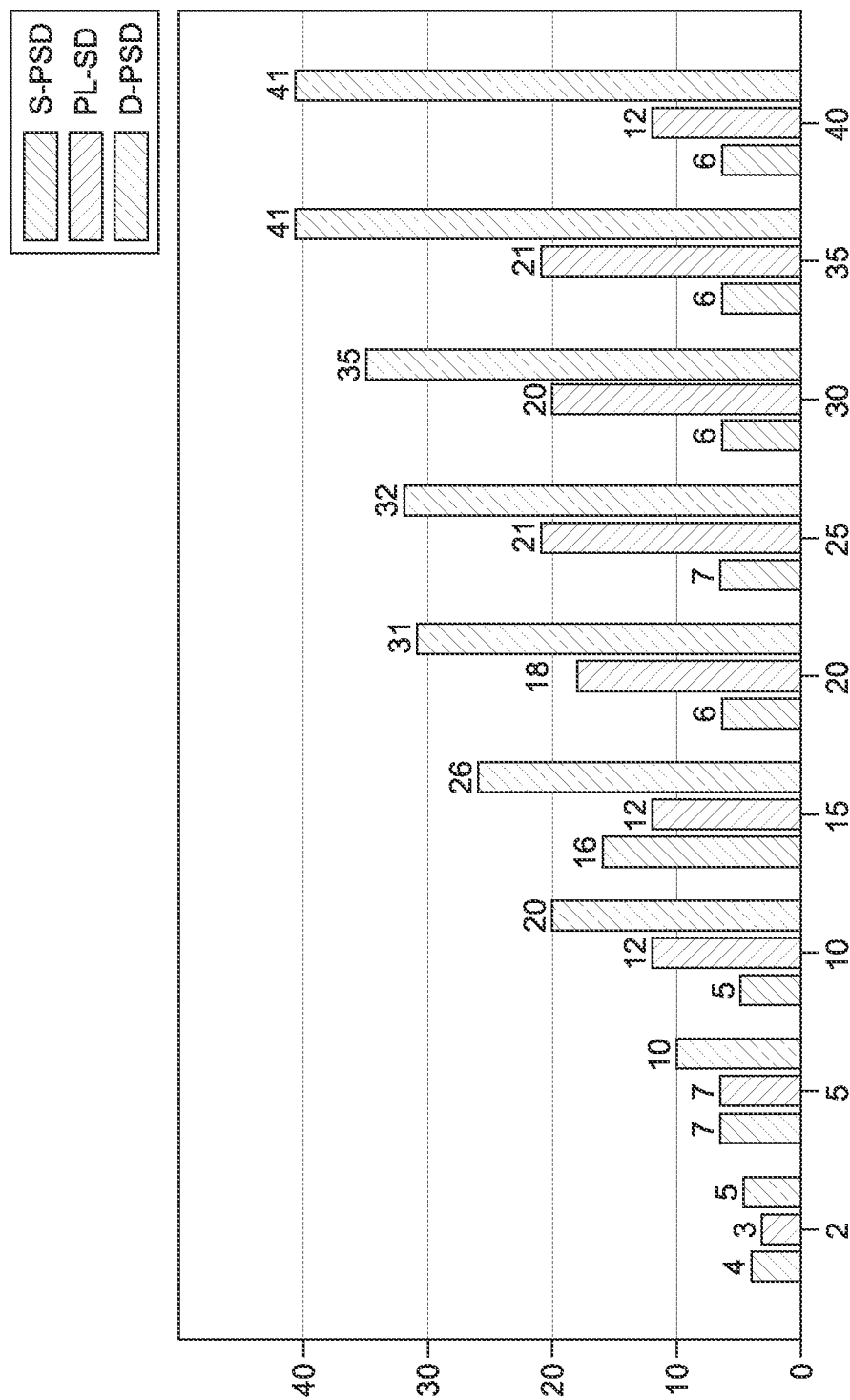
FIG. 9 illustrates the number of visited search-tree nodes for the SD approach with various exploration strategies.

FIG. 8 shows the impact of increasing the number of parallel threads on the time complexity of the parallel SD approaches. This time is measured for SNR equals to zero. FIG. 9 shows the speedup obtained by these approaches for each number of threads. The first observation based on the FIG. 8 is the positive impact of the parallelism on reducing the complexity of the SD algorithm. As can be seen in FIG. 8, the curve 800 of the low-level parallel approach has three phases. A first phase, between two and ten threads, is characterized by a rapid decrease in complexity, when increasing the number of threads. This means that adding threads in this phase is beneficial and reduces the complexity of the overall process. This is due to the positive impact of splitting the work-load over several processing elements (CPU-cores) and the low synchronization overhead. This overhead is related to the concurrent access to the same data structure that contains the search tree. This data structure needs to be accessed by one thread at a time to have a valid execution result. After that, begins a second phase, between ten and thirty-five threads, where adding new threads has no impact on the decoding time. This can be explained by the fact that the synchronization overhead neutralizes the gain of exploiting additional processing elements. After that, the third phase begins. This last phase is characterized by an increase in the complexity when increasing the number of parallel threads. This behavior is related to the overhead of synchronization which increases when increasing the number of threads along with the sequential execution of threads by processing elements. As a result, an ideal number of threads for this low-level version will be between twenty and thirty for the parallel approach.

FIG. 8 also shows the results of the high-level parallel approach with static and dynamic load-balancing strategies. This parallel version is based on splitting the search tree into several subtrees, where each one is explored independently by a parallel thread, as discussed in FIG. 6. The gain obtained by the high-level approach using a static load-balancing (S-PSD, see curve 802) strategy is limited due to the imbalanced work-load in each subtree. This results in a long execution time for a few threads while others are ideal. By adding the dynamic load-balancing strategy (D-PSD, see curve 804), the performance of the high-level parallel approach improved substantially. In fact, adding the novel dynamic load-balancing strategy allowed the system to reach a relative speedup of forty times faster using twenty CPU-cores and thirty-five parallel threads as compared to the optimized serial SD version (see curve 806). The curve 804 of the high-level approach has two phases. A first phase characterized by a rapid decrease in complexity (increase in speedup), and a second phase where adding new threads does not change the complexity. The first phase, between two and twenty threads has a super-linear speedup.

This speedup is the result of (1) low synchronization overhead since each thread explores its subtree independently from the others; therefore, no concurrent access to the same data structure, (2) the fair work-load distribution among the parallel threads due to the novel load-balancing strategy; this latter strategy prevents the idleness of threads, and (3) the diversification gain, that allows to reduce the explored search space as compared to the serial version. Indeed, dividing and exploring the search tree in parallel may result in a rapid improvement of the radius, which allows to avoid the exploration of several branches explored in the sequential version. This results in a super-linear speedup as in this case. Moreover, when the number of threads is greater than twenty, which is the number of available processing elements (CPU-cores), a second phase begins. In this phase, the complexity of the high-level approach should be increasing due to the serial execution of threads by the processing elements. However, this is not the case. In fact, FIG. 8 shows that performance improvement continues and reaches 41× speedup when using forty threads. This behavior can be explained by the diversification gain that neutralizes the serial execution overhead of threads and improve the performance.

The scalability of the algorithm refers to the possibility of still improving the performance of the parallel approaches when using a large number of processing elements. According to FIG. 9, the low-level approach PL-SD does not scale well since all parallel threads operates on a single search tree, which induces a synchronization overhead, which affects the performance. This is not the case for the high-level approach, which is highly parallel due to the low communication and synchronization costs between the parallel threads, since each one operates on its own search tree. However, it needs a load balancing strategy to ensure a fair workload distribution among parallel threads.

Figure 10A:
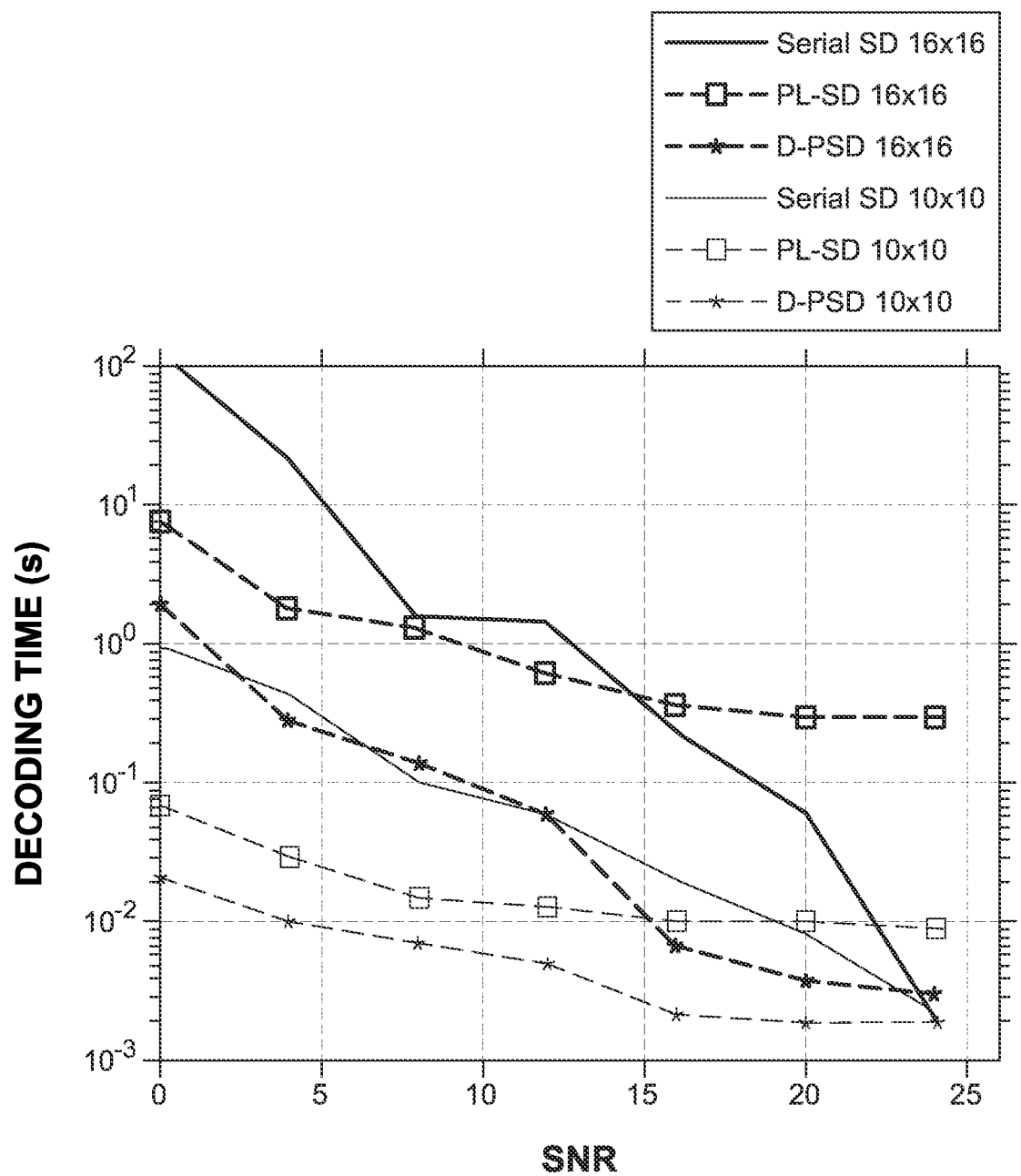
FIG. 10A illustrates the decoding time for the novel strategies and traditional strategies for various SNR values.
Figure 10B:
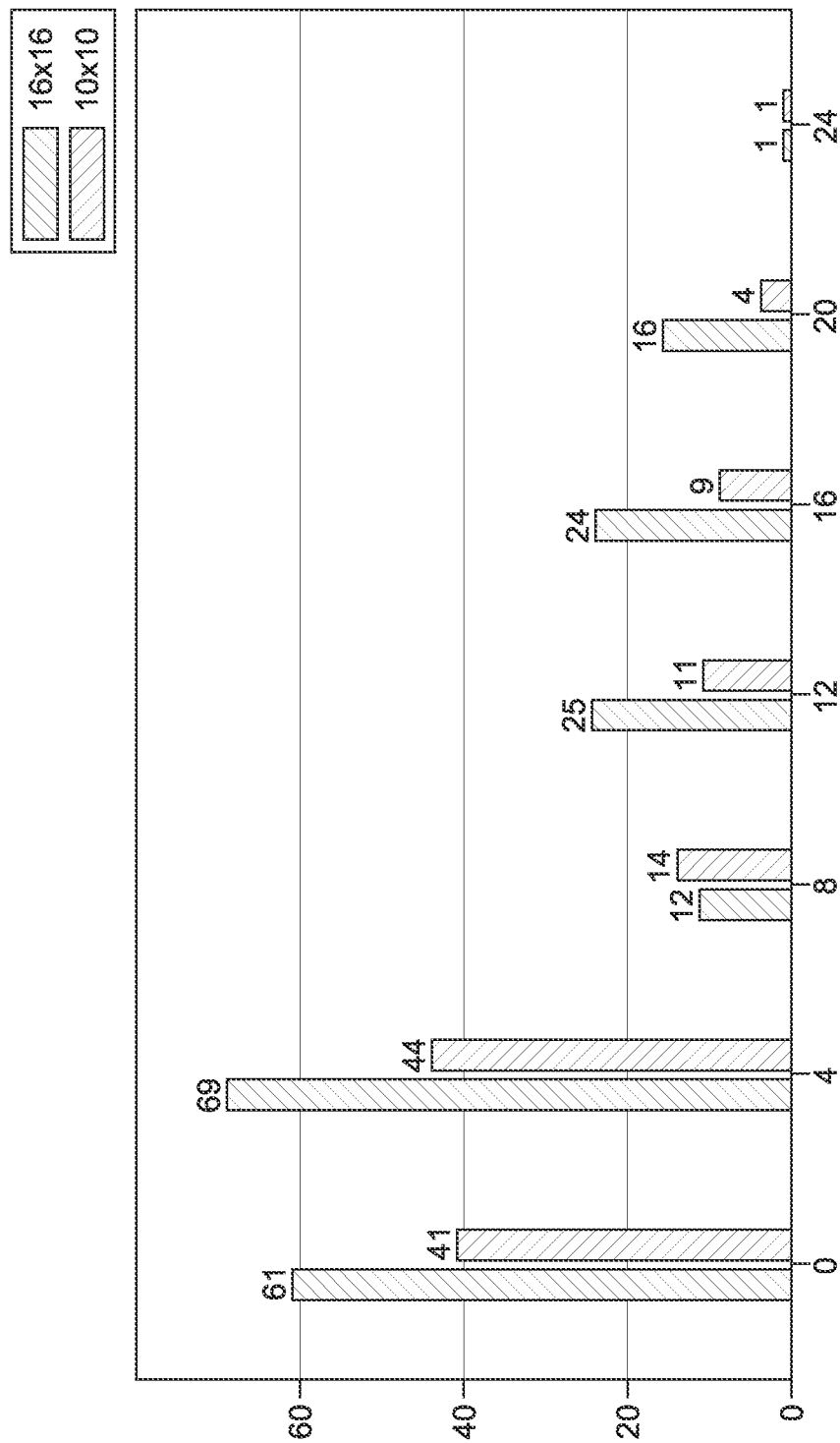
FIG. 10B illustrates the speed up of the novel approach, and FIG. 10C compares the symbol error rate versus SNR for the novel approach.
Figure 10C:
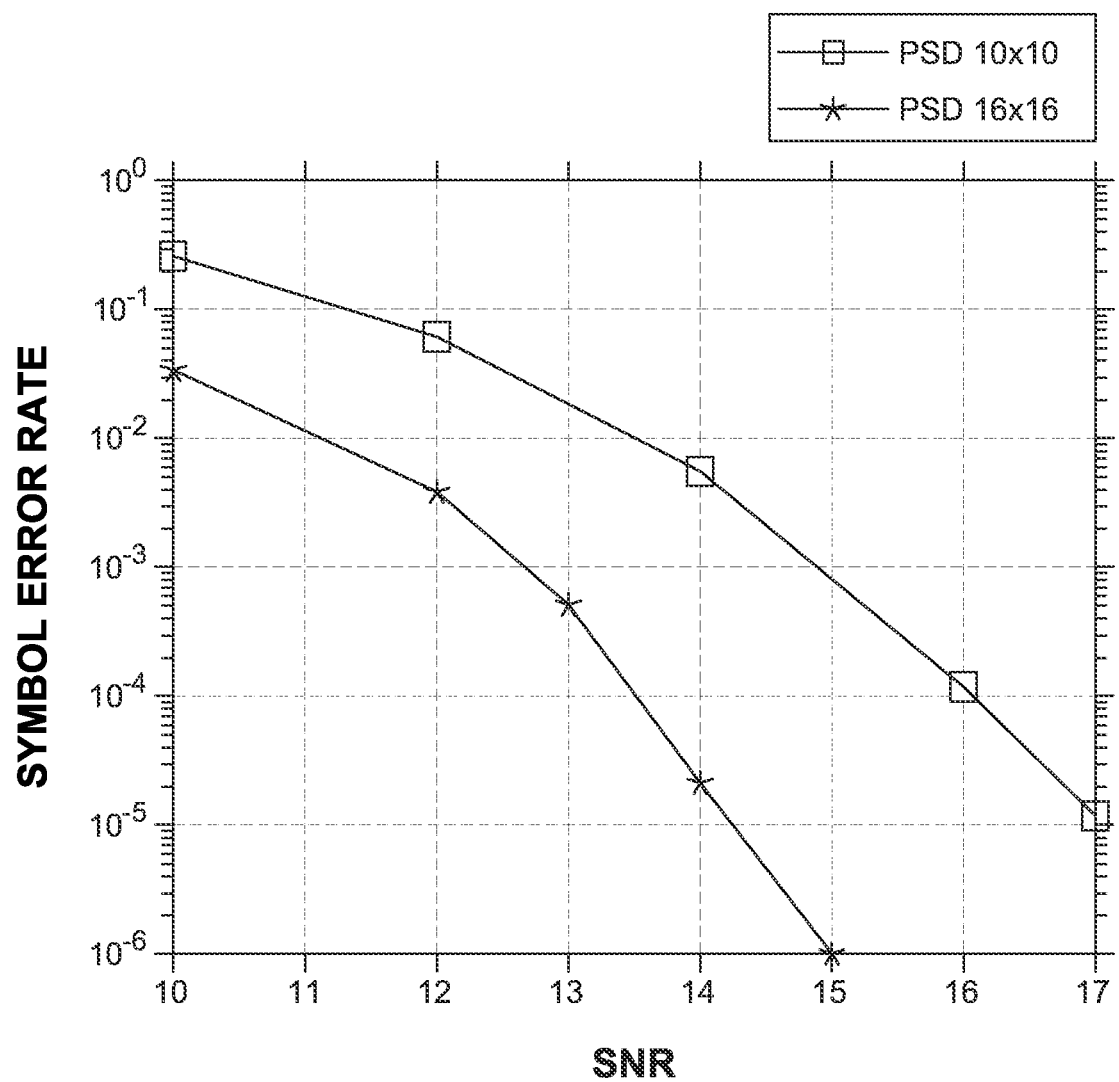

FIG. 10A shows the performance in terms of the complexity of the parallel approaches when increasing the SNR for two MIMO systems (10×10 and 16×16) using 16-QAM modulation. Both parallel approaches use thirty-five threads. Moreover, the speedup shown in FIG. 10B is obtained by the high-level parallel approach (D-PSD). FIG. 10C shows the error rate for the PSD algorithm. Based on the results shown in FIG. 10A, it is noted that the performance of the parallel approaches decreases when increasing the SNR. This is caused by the decrease in work-load for each parallel process when increasing the SNR since the sphere radius gets smaller. The high-level approach gives a better performance for these two MIMO configurations when compared to the low-level approach. The low-level approach does not perform well for high SNR and has a higher complexity when compared to the sequential SD due to the synchronization overhead. FIG. 10A shows a good performance for the high-level parallelization scheme, especially for SNR between 0 and 8 db, where the system has been able to reach a speedup around 69 times faster when compared to the optimized sequential SD algorithm. This speedup is obtained by using 35 threads and exploiting 20 processing elements (CPU-cores). This speedup is the result of: (1) reducing the synchronization overhead by choosing a good parallelization scheme, (2) exploiting efficiently the available computing resources by fairly dividing the work-load using the load balancing strategy discussed above, and (3) taking advantage of the diversification gain. Moreover, FIG. 10C shows the optimal Symbol Error Rate of the PSD for a 10×10 and 16×16 MIMO systems using 16-QAM modulation.

Figure 11A:
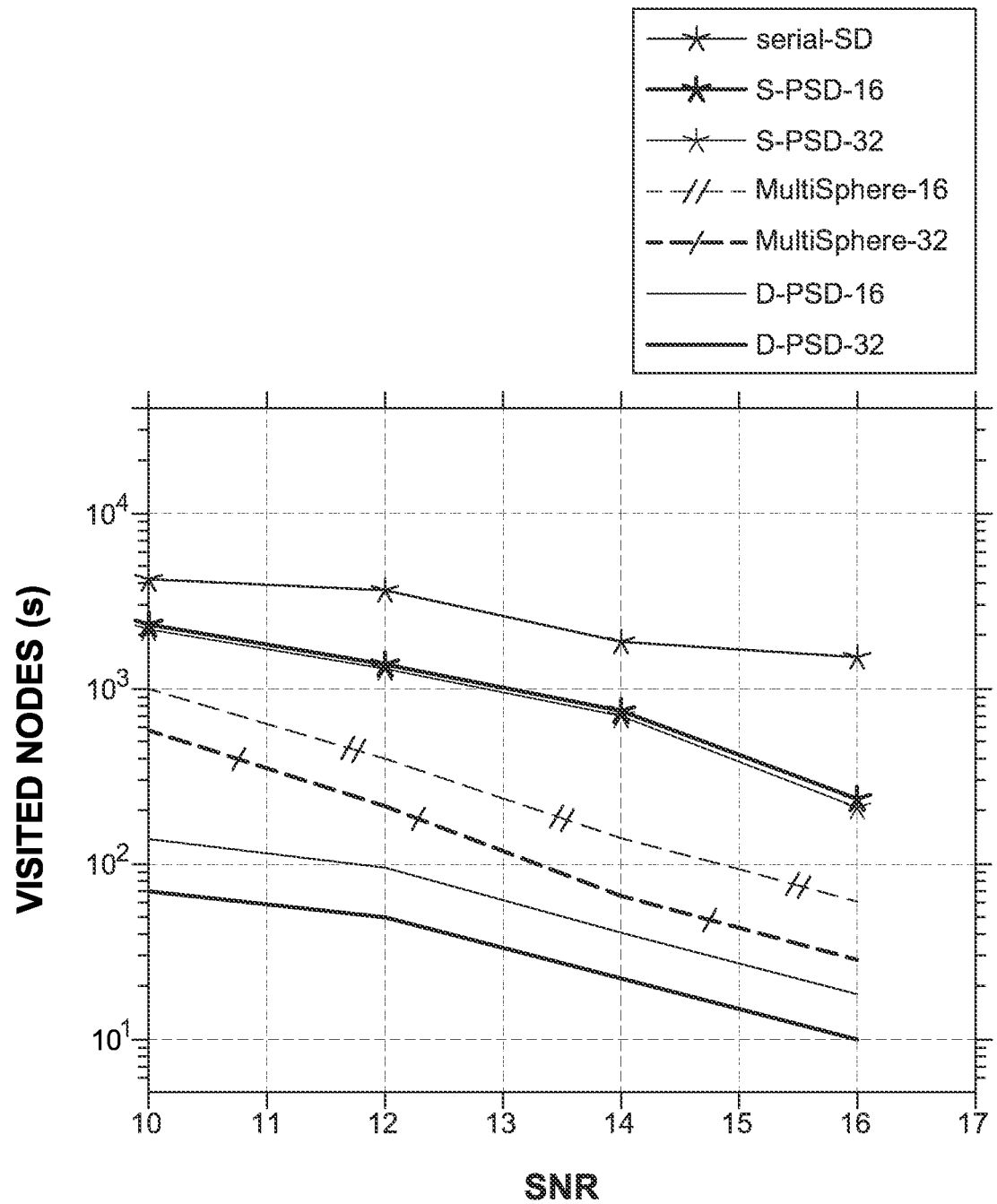
FIG. 11A shows the latency of the system versus the SNR for the novel and traditional approaches.
Figure 11B:
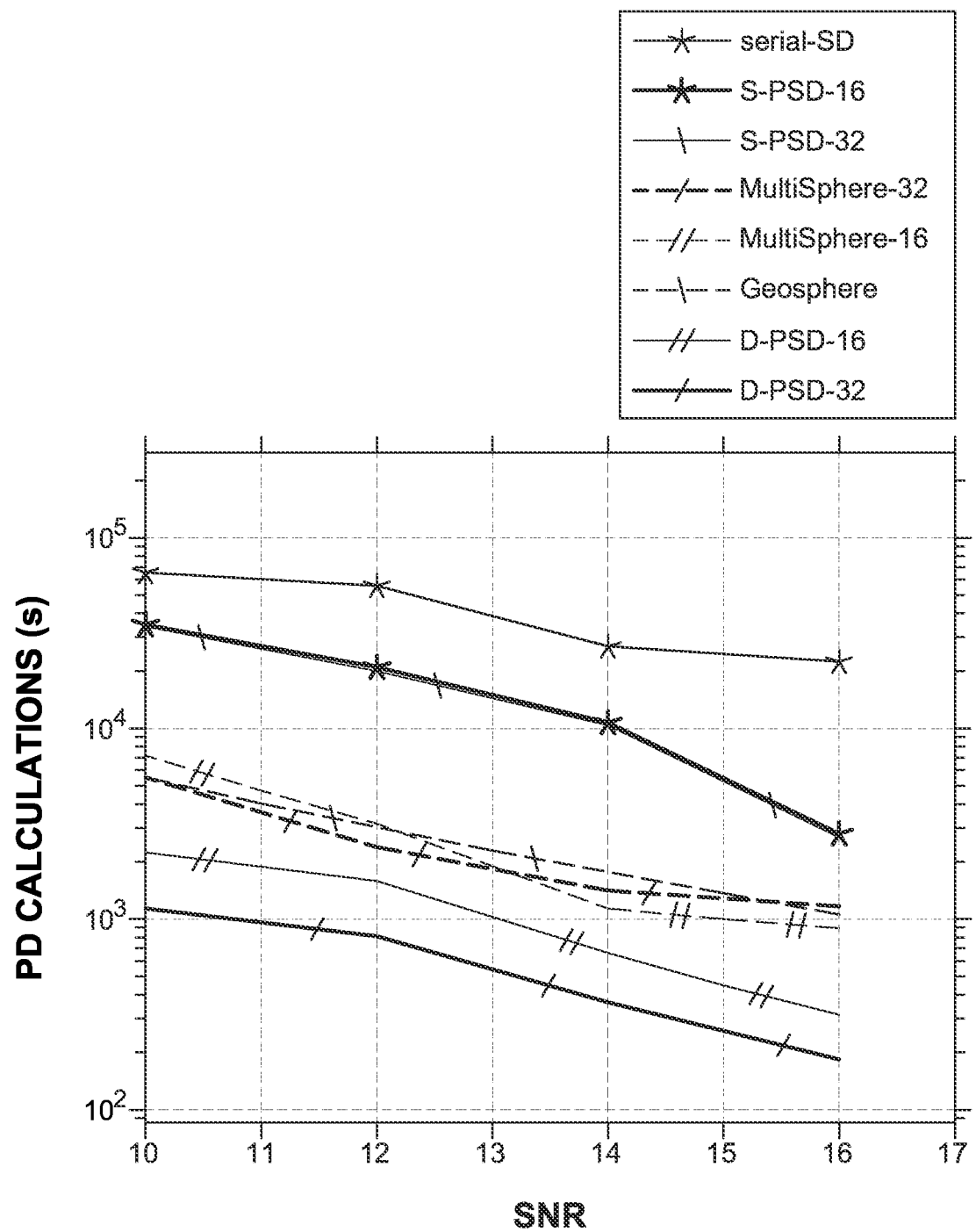
FIG. 11B shows the complexity of these approaches versus the SNR.

The performance of the high-level parallel approach discussed above with regard to FIG. 6 is now compared with most recent approaches in the literature [6], [7]. FIGS. 11A and 11B show a comparison between the latency and complexity of the PSD approach for two cases (16 and 32 threads) with the state-of-the-art parallel MultiSphere [6], Geosphere SDs [7], and the serial SD implementation for 16-QAM modulation using a 10×10 MIMO system. For a fair comparison, the initial sphere radius is set to infinite. The number of visited nodes refers to the average number of nodes (per thread) on which the branching process is performed, and the PD calculations refer to the average number of partial distance calculations, i.e., the average number of evaluated search tree nodes per thread. The PD calculations represents an important factor that highly influences the complexity of the decoding approaches. For the S-PSD approach, these numbers are measured for the thread with the largest work-load, since the complexity of the parallel version depends on the complexity of this thread.

FIGS. 11A and 11B validate the results of the proposed parallel approach (PSD), especially when using the dynamic load balancing strategy. For both the 16 and 32 cases, the results of the D-PSD outperform the results of the parallel MultiSphere and serial Geosphere in terms of both of the visited nodes and the PD calculations. Indeed, when increasing the number of threads from 16 to 32, the D-PSD approach consistently improves the performance in terms of both of the visited nodes and the PD calculations. This is not the case of the MultiSphere approach and the S-PSD in terms of PD calculations due to the unbalanced workload between the parallel threads. Moreover, the D-PSD reduces the complexity by a factor of 58× as compared to the serial SD and 5× as compared to the MultiSphere parallel approach.

Figure 12:
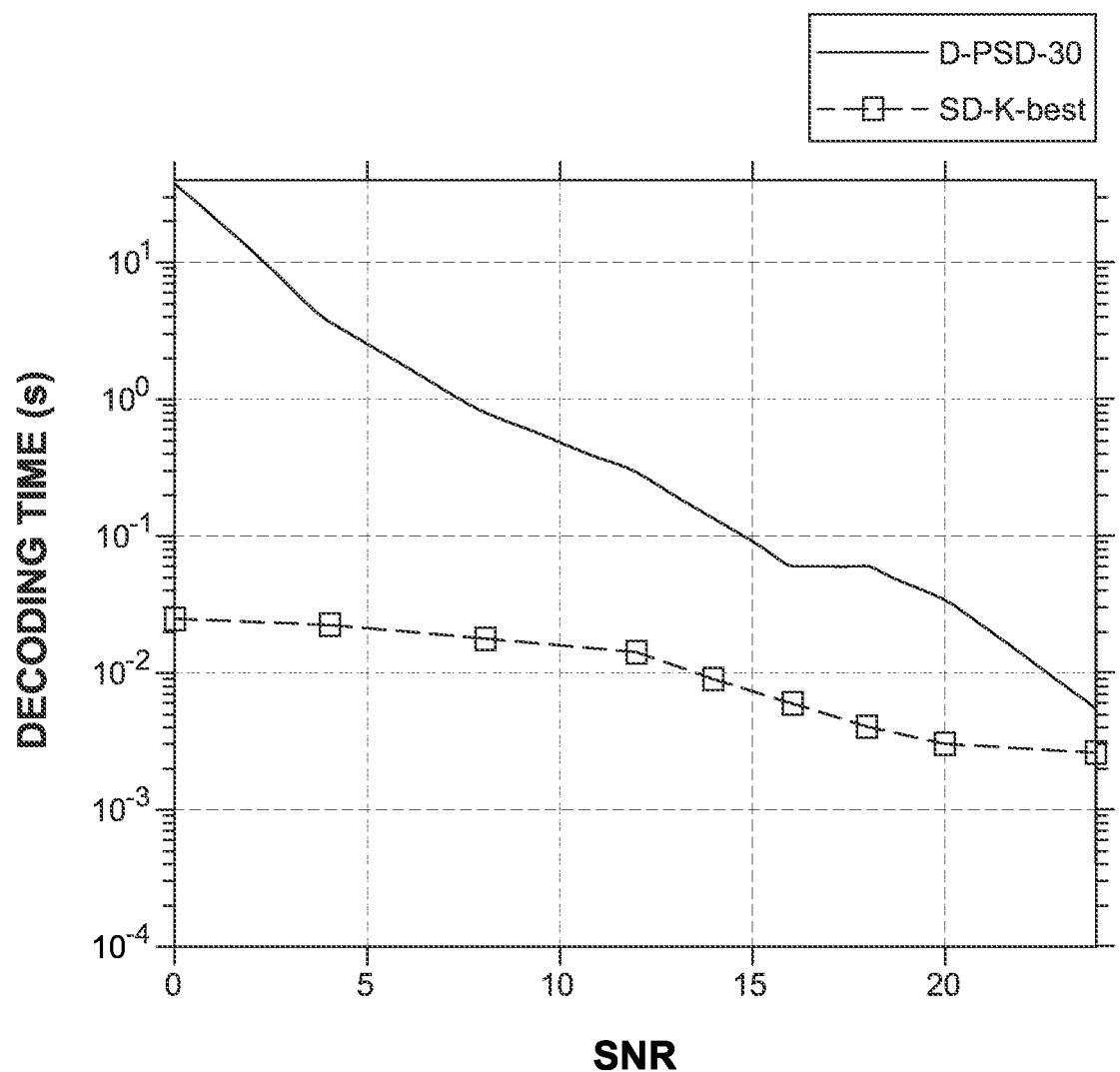
FIG. 12 compares the decoding time for the novel and traditional approaches versus the SNR.

The hybrid SD-K-best approach has also been tested and compared with the existing K-best algorithm. As discussed with regard to FIGS. 6 and 7, the hybrid algorithm accelerates the exploration of the SD search tree, stored in the master process, in an approximate way, by using several low-complexity K-best algorithms (workers) running in parallel to meet the real-time requirement. In this regard, FIG. 12 shows a comparison between the performance, in terms of the complexity, of the SD-K-best approach as compared to the D-PSD approach for a 18×18 MIMO system with 16-QAM modulation. It can be seen from the figure that the SD-K-best performs better in terms of complexity as compared to the PSD approach because the SD-K-best approach only partially explores the search tree. This makes this algorithm more applicable for various cases. It is also noted that the SD-K-best approach is able to meet real-time response from 13 dB, while the parallel PSD reaches this complexity at 23 dB, i.e., a 10 dB difference in the power consumption.

Figure 13:
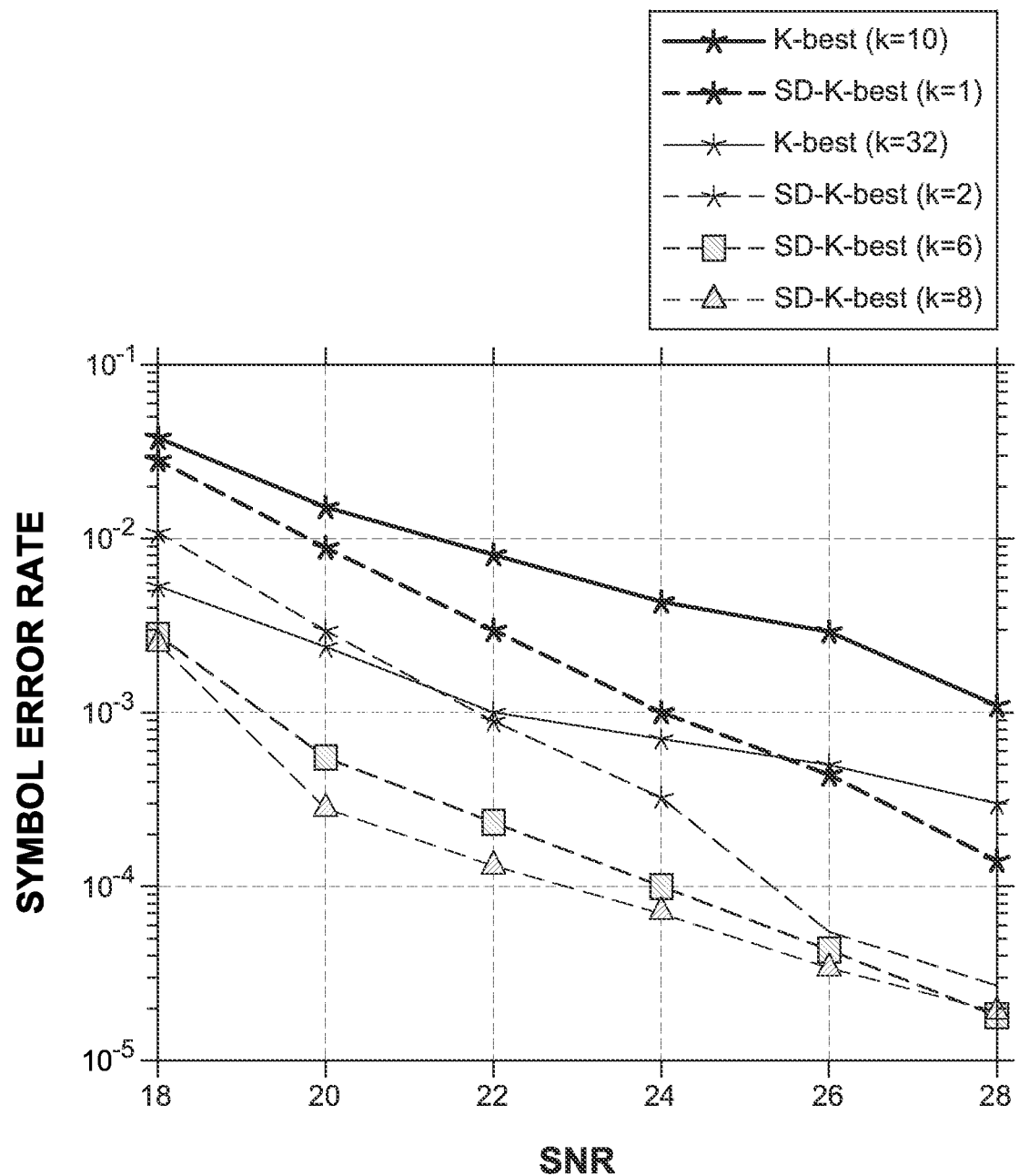
FIG. 13 compares the symbol error rate versus the SNR for the novel and traditional approaches.
Figure 14A:
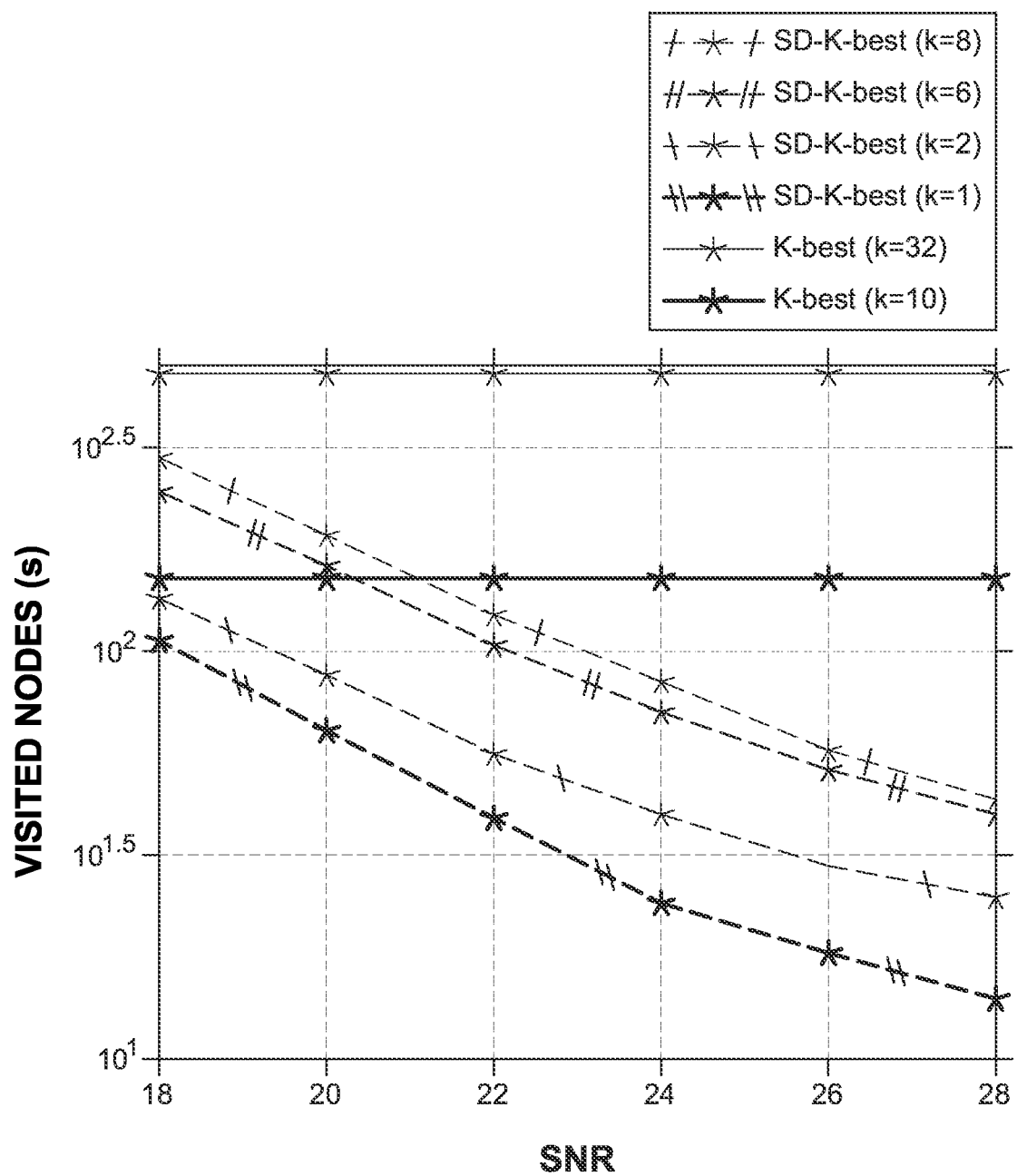
FIG. 14A illustrates the latency and FIG. 14B illustrates the complexity of the novel and traditional approaches versus the SNR, for various levels of K.
Figure 14B:
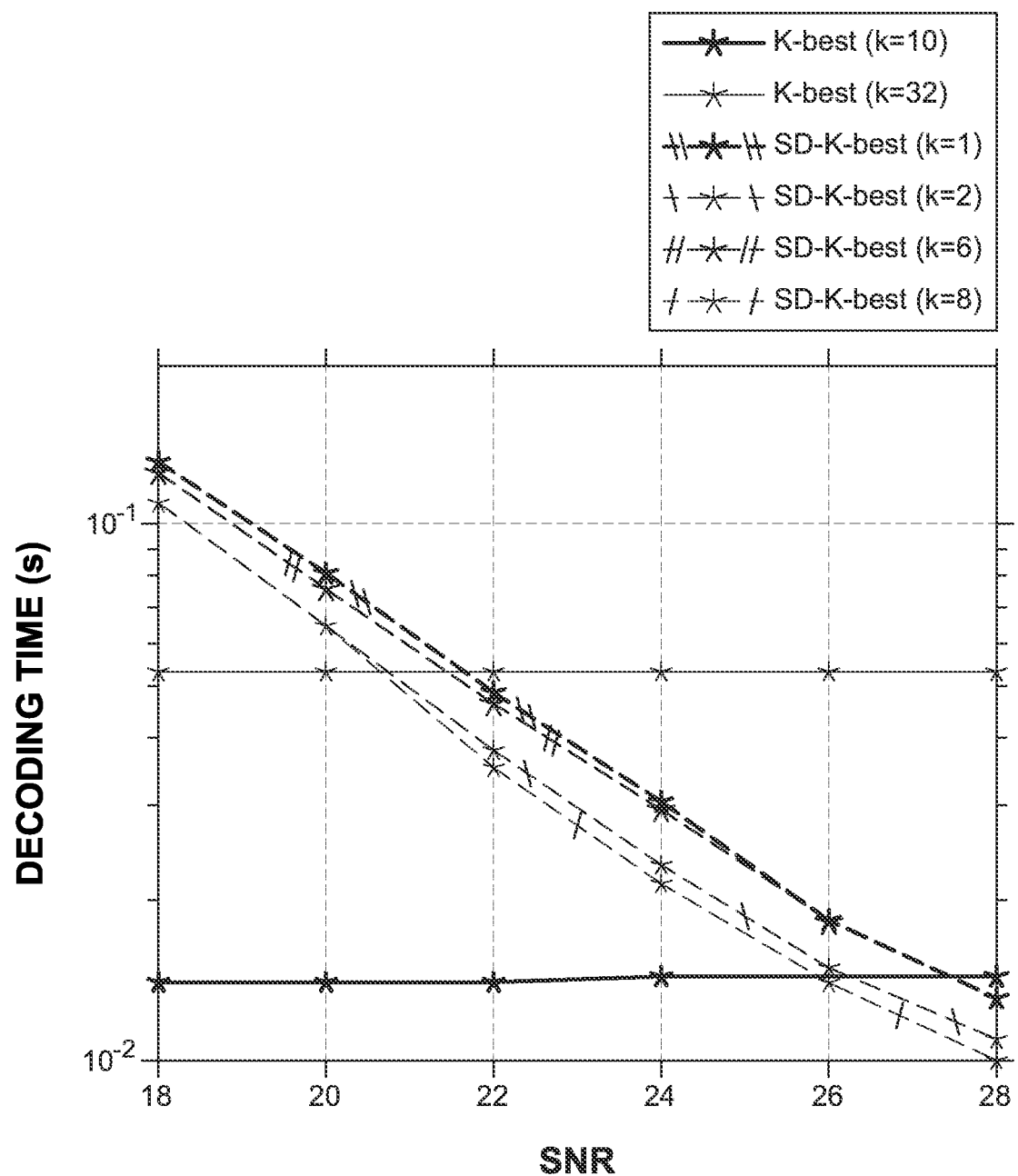

FIG. 13 shows the SER performance and FIGS. 14A and 14B show the complexity results for a 16×16 MIMO system using 64-QAM modulation. The figures compare the results of the SD-K-best algorithm with the results of the K-best algorithm. The SD-K-best algorithm uses twenty threads: one as a master process with an SD instance and nineteen as workers using the K-best algorithm to accelerate the search process. FIG. 13 shows the results of the SD-K-best with several configurations K∈{1, 2, 6, 8}. The figure also shows the results of the K-best algorithm with two configurations K=10 and K=32. The value of K refers to the number of kept nodes at each level by the K-best algorithm (see FIG. 7), as well as the number of workers in the SD-K-best approach. The error rate for the K-best algorithm with ten kept nodes does not reach the acceptable error rate ($10^{-3}$) even when reaching 26 dB. By increasing the value of K to 32, the performance of the K-best algorithm is improved to meet this requirement. As compared to the K-best algorithm, the SD-K-best algorithm performs better in terms of the error rate and reaches an acceptable rate even with a small value of the kept nodes. When increasing the number of the kept nodes, the performance of the SD-K-best algorithm increases until reaching stagnation, i.e., increasing the number of the kept nodes has a minor impact on the SER. Moreover, the SD-K-best algorithm is able to reach an acceptable error rate at around 20 dB, thus, a four dB improvement in the power consumption as compared to the K-best algorithm when K=32. The performance of the new approach in terms of the error rate is explained by the large number of explored combinations as compared to a conventional K-best algorithm as each worker takes a subtree from the master and explores it according to the K-best algorithm, while taking benefit from the sphere radius to explore only promising branches which reduces the complexity.

FIG. 14A shows the average number of explored nodes per thread of the SD-K-best algorithm against the number of explored nodes by the K-best algorithm for a 16×16 64-QAM MIMO system. In the same way, FIG. 14B shows the time complexity of the SD-K-best approach against the K-best algorithm for the same MIMO system. It can be seen from FIGS. 14A and 14B that the complexity and the number of visited nodes by the K-best algorithm are fixed and stable across the SNR. This is not the case for the SD-K-best algorithm because the average number of the explored nodes per thread decreases when increasing the SNR. This behavior is closely related to the sphere radius which depends essentially on the SNR, i.e., the higher the SNR, the smaller the radius, thus reducing the number of explored nodes and the complexity. However, the whole number of explored nodes by all workers in the SD-K-best algorithm is much bigger as compared to the K-best algorithm, which explains the improvement in the error rate.

Moreover, FIG. 14B shows that the complexity of the SD-K-best algorithm is higher than the complexity of the K-best algorithm in SNR between 18 and 22 dB region. This is due to the fact that the SD-K-best explores more search space than the K-best algorithm. Furthermore, the high complexity is also explained by the complexity of the SD algorithm executed by the master process. However, this is not the case in the high SNR region (22 dB to 26 dB) where the SD-K-best algorithm has less complexity than the K-best algorithm. This is the results of an efficient pruning process due to the small sphere radius in this region. In other words, the SD-K-best in the high SNR region explores less solutions, but they are of good quality as compared to the K-best explored combinations.

The challenge to deal with massive MIMO efficiently is based on finding the appropriate trade-off between the complexity and the performance in terms of the error rate. To find this trade-off in this embodiment, the novel approach combined the strengths of both the PSD and K-best algorithms to ensure a low complexity and good BER at the same time. Unlike the existing algorithms, the SD-K-best approach is able to reach both a real-time complexity and a good error rate for SNR equals to 28 dB.

Figure 15A:
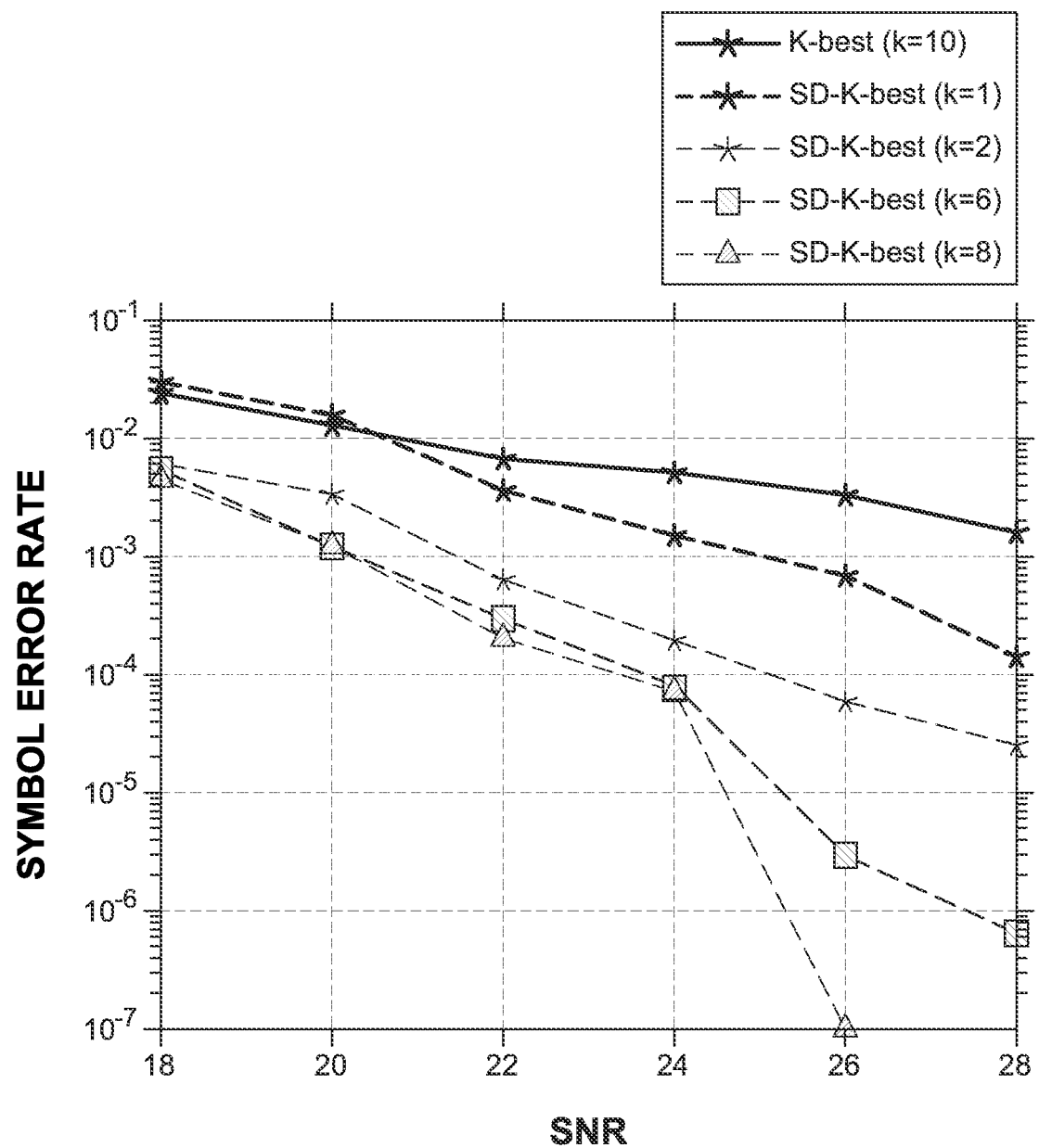
FIG. 15A illustrates the symbol error rate and FIG. 15B illustrates the complexity of the novel and traditional approaches versus the SNR, for various values of K.
Figure 15B:
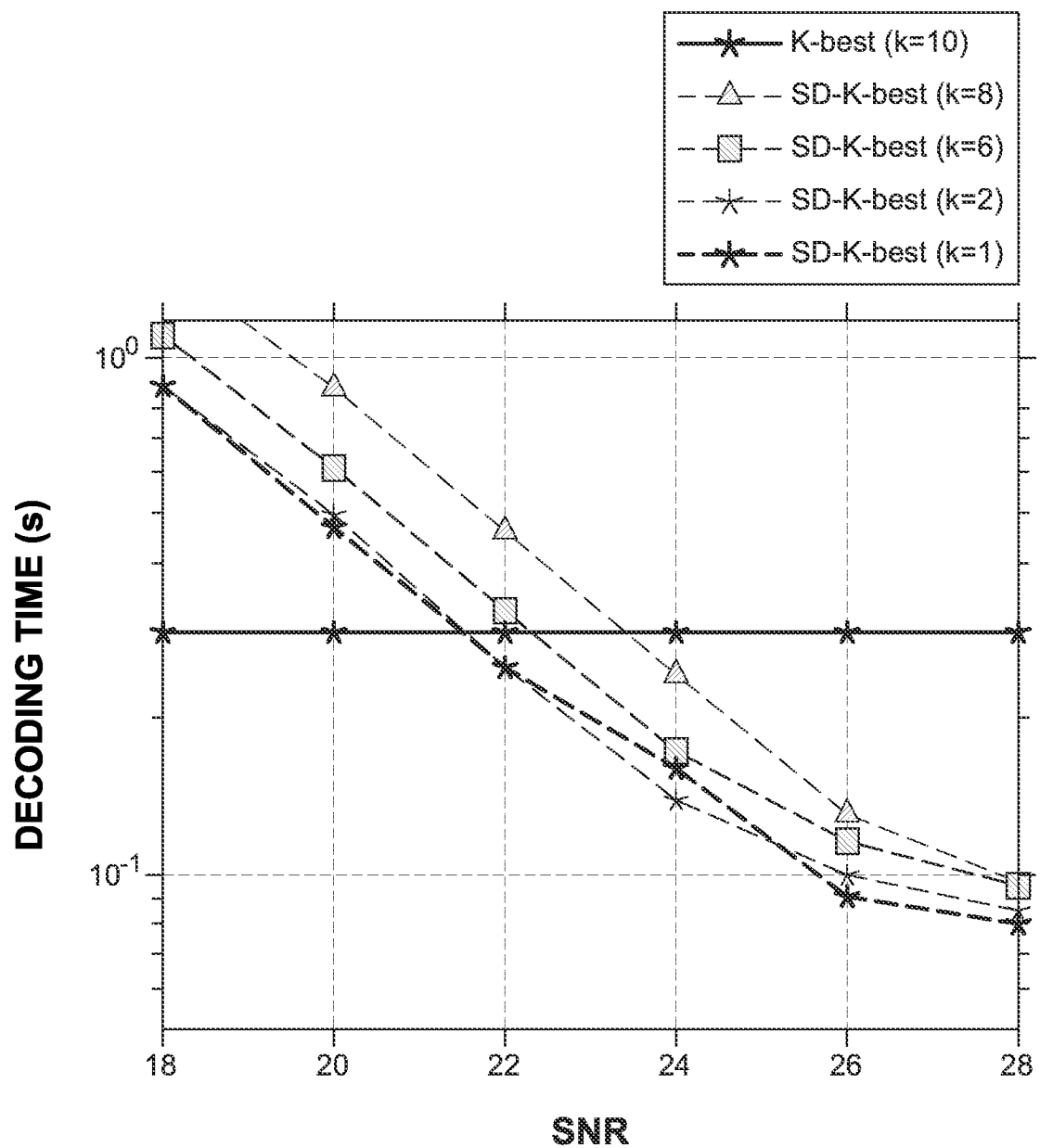

Next, the inventors scaled-up the number of antennas to evaluate the ability of the hybrid SD-K-best algorithm to guarantee both the low complexity and the good error rate performance. FIGS. 15A and 15B show the obtained results in terms of error rate performance and complexity, respectively, for a 100×100 MIMO system with the 64-QAM modulation, i.e., an uncoded transmission rate of 400 bits per transmission. The first observation from the figures is the ability of the hybrid algorithms to deal with large MIMO systems. This is not the case of the traditional SD algorithm due to its high complexity. FIG. 15A shows the large improvement in terms of the error rate performance of the SD-k-best algorithm with a low number of kept nodes, as compared to the K-best algorithm, also due to the diversification gain obtained from using the parallelization. Moreover, starting from 22 dB, the hybrid algorithm has a lower complexity than the K-best algorithm due to the small radius in this region, which indicates an efficient pruning process. Furthermore, increasing the number of kept-nodes for the SD-K-best algorithm has a good impact of the error rate, without increasing much the complexity, as shown in FIG. 15B. Indeed, the diversification gain improves more efficiently the radius, which helps to reduce the overhead due to the increasing in the number of kept-nodes.

In addition, the high SNR region in FIG. 15B shows that the curves begin to stabilize (floor) before even reaching the 10 ms threshold. In fact, when dealing with a larger number of antennas and constellation sizes, reaching a first leaf node can take more than 10 ms. This is due to the heavy computation needed at each level of the tree and the limited number of computing elements in the CPU architecture. For this reason, it is desired to use highly efficient computing architectures with a large number of computing elements such as GPUs.

Based on these observations, one can conclude that the embodiments discussed herein take the SD algorithm and successively modify it to improve its efficiency. Initially, the components of the SD algorithm were optimized, especially the exploration strategies and the evaluation process since they have a large impact on its complexity. Because the search tree for all the possible combinations of the transmitted vector is large, new architectures were implemented aiming to speed up the search-tree exploration process, by using parallel architectures. Then, the use of hybrid algorithms has been introduced to perform a trade-off between the complexity and the performance of the approach, to further improve its efficiency. The obtained results in each step not only resulted in the speed up of the SD algorithm by a factor of 60× using a 16-QAM modulation, but also allowed to deal with large MIMO systems with dense constellations, such as 100×100.

Figure 16:
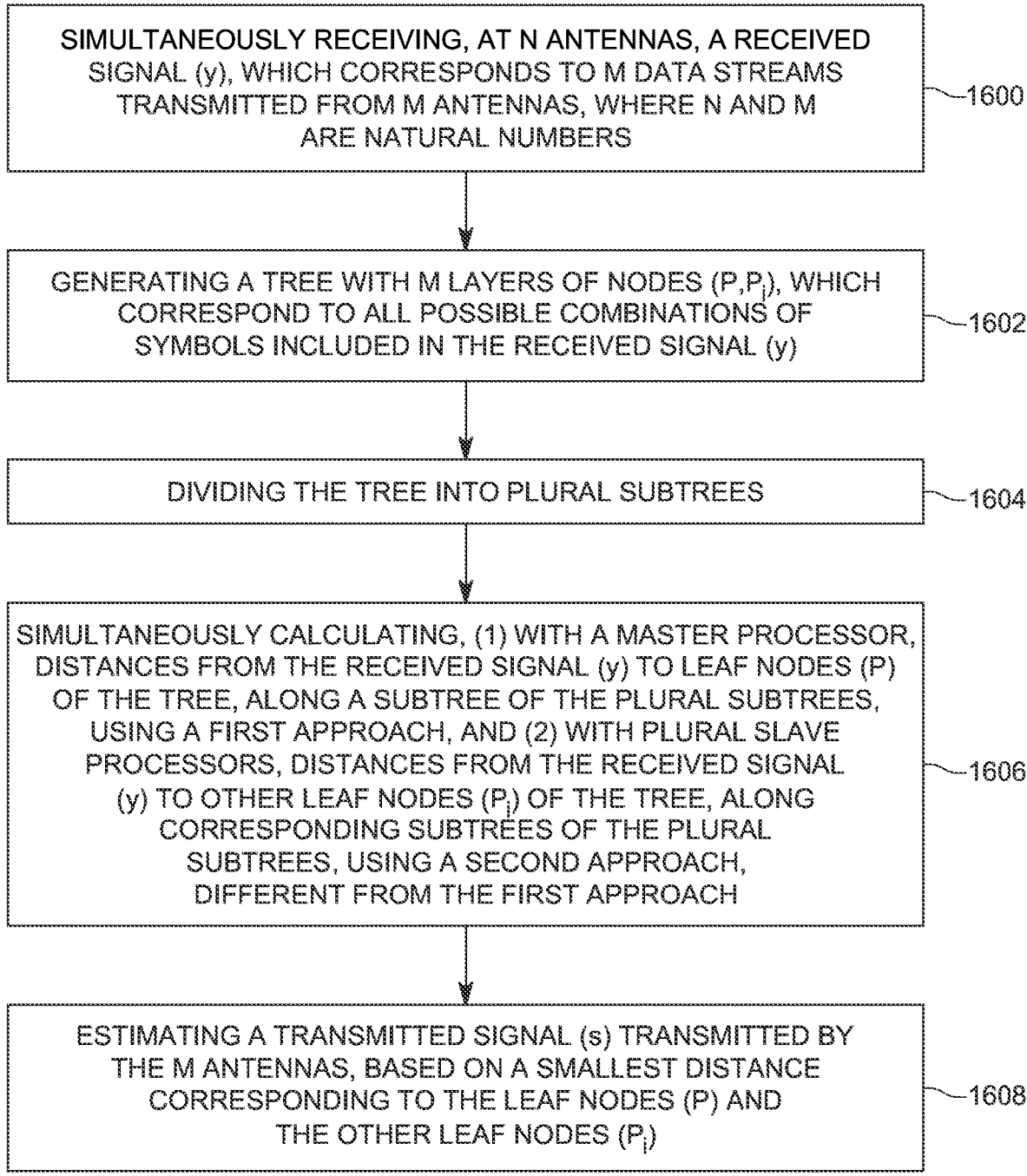
FIG. 16 is a flow chart of a method for calculating a transmitted signal with a massive MIMO.

A massive MIMO method for processing data is now discussed with regard to FIG. 16. The method includes a step 1600 of simultaneously receiving, at N antennas, a received signal (y), which corresponds to M data streams transmitted from M antennas, where N and M are natural numbers, a step 1602 of generating a tree 200 with M layers of nodes (P, $P_i$), which correspond to all possible combinations of symbols included in the received signal (y), a step 1604 of dividing the tree 200 into plural subtrees 610-$n$, a step 1606 of simultaneously calculating (1) with a master processor, distances from the received signal (y) to leaf nodes (P) of the tree 200, along a subtree 610-0 of the plural subtrees 610-$n$, using a first approach, and (2) with plural slave processors, distances from the received signal (y) to other leaf nodes ($P_i$) of the tree 200, along corresponding subtrees 610-I of the plural subtrees 610-$n$, using a second approach, different from the first approach, and a step 1608 of estimating a transmitted signal (s) transmitted by the M antennas, based on a smallest distance corresponding to the leaf nodes (P) and the other leaf nodes ($P_i$). The transmitted signal (s) is a vector having M components and the received signal (y) is a vector having N components.

In one application, the first approach is a sphere decoder approach and the second approach is a K-best approach. The master processor divides the tree into the plural subtrees. The method may further include, for each of the master processor and the slave processors, branching a corresponding tree; evaluating a distance of each node from the received signal (y); and removing nodes that are outside a sphere determined by a radius r from a root node of the tree. The method may also include a step of sharing the radius r by all the master and slave processors, and/or a step of dynamically adjusting the radius r by ordering the nodes in the tree based on the calculated distances and selected a new value of the radius by taking a smallest distance of a node in a given level. In one embodiment, the method includes a step of branching each node over plural symbols, and/or storing the distance of each node at a given level, and evaluating distances for nodes at a next level by using the stored distance from the given level. In one application, the K-best approach maintains only K nodes at each level, where K is a natural number. The step of calculating is performed independently by each of the master and slave processors. The method may further include a step of evaluating, at the master processor, a load of the slave processors; and redistributing a work load of the slave processors to be substantially even.

Figure 17:
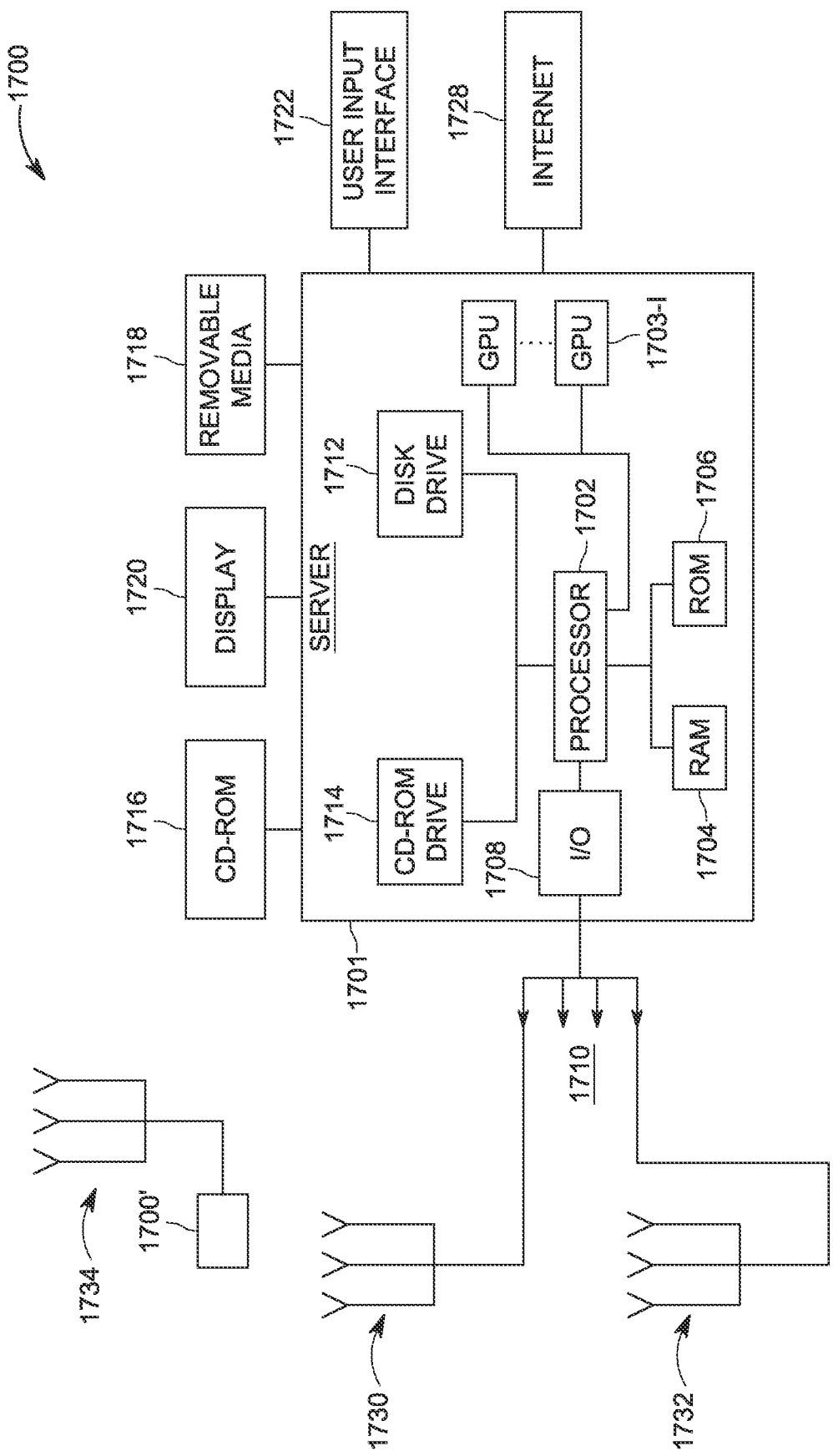
FIG. 17 is a schematic diagram of a massive MIMO system.

The above-discussed procedures and methods may be implemented in a computing device as illustrated in FIG. 17. Hardware, firmware, software or a combination thereof may be used to perform the various steps and operations described herein. The computing device 1700 suitable for performing the activities described in the above embodiments may include a server 1701. Such a server 1701 may include a central processor (CPU) 1702 coupled to a random access memory (RAM) 1704 and to a read-only memory (ROM) 1706. ROM 1706 may also be other types of storage media to store programs, such as programmable ROM (PROM), erasable PROM (EPROM), etc. Processor 1702 may communicate with other internal and external components through input/output (I/O) circuitry 1708 and bussing 1710 to provide control signals and the like. Processor 1702 carries out a variety of functions as are known in the art, as dictated by software and/or firmware instructions.

Server 1701 may also include one or more data storage devices, including hard drives 1712, CD-ROM drives 1714 and other hardware capable of reading and/or storing information, such as DVD, etc. In one embodiment, software for carrying out the above-discussed steps may be stored and distributed on a CD-ROM or DVD 1716, a USB storage device 1718 or other form of media capable of portably storing information. These storage media may be inserted into, and read by, devices such as CD-ROM drive 1714, disk drive 1712, etc. Server 1701 may be coupled to a display 1720, which may be any type of known display or presentation screen, such as LCD, plasma display, cathode ray tube (CRT), etc. A user input interface 1722 is provided, including one or more user interface mechanisms such as a mouse, keyboard, microphone, touchpad, touch screen, voice-recognition system, etc.

Server 1701 may be coupled to other devices, such as N digital receivers or antennas 1730 for receiving signals and M waveform generators 1732 for generating and emitting signals. FIG. 17 also shows M generators or antennas 1734 that are associated with another computing device 1700', which may be a smart device, a cell tower, etc. The server 1701 may be used to implement the master 601 of FIG. 6 into the processor 1702 and the workers into the same processor, or additional processors, e.g., GPU 1703-I. The server may be part of a larger network configuration as in a global area network (GAN) such as the Internet 1728, which allows ultimate connection to various landline and/or mobile computing devices.

The disclosed embodiments provide a new method for dealing with massive MIMO systems by finding an appropriate trade-off between the complexity and the performance in terms of error rate, which can be achieved by combining the strengths of both the parallel SD and K-best algorithms. The embodiments discussed herein are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] Fincke, U., and Pohst, M. Improved methods for calculating vectors of short length in a lattice, including a complexity analysis. Mathematics of computation 44, 170 (1985), 463-471.
[2] Hassibi, B., and Vikalo, H. On the sphere-decoding algorithm i. expected complexity. IEEE transactions on signal processing 53, 8 (2005), 2806-2818.
[3] Viterbo, E., and Boutros, J. A universal lattice code decoder for fading channels. IEEE Transactions on Information theory 45, 5 (1999), 1639-1642.
[4] BLAS. Basic linear algebra subprograms. 2013.
[5] Wong, K.-w., Tsui, C.-y., Cheng, R.-K., and Mow, W.-h. A vlsi architecture of a k-best lattice decoding algorithm for mimo channels. In Circuits and Systems, 2002. ISCAS 2002. IEEE International Symposium on (2002), vol. 3, IEEE, pp. III-III.
[6] Nikitopoulos, K., Georgis, G., Jayawardena, C., Chatzipanagiotis, D., and Tafazolli, R. Massively parallel tree search for high-dimensional sphere decoders. IEEE Transactions on Parallel and Distributed Systems (2018).
[7] Nikitopoulos, K., Zhou, J., Congdon, B., and Jamieson, K. Geosphere: Consistently turning mimo capacity into throughput. ACM SIGCOMM Computer Communication Review 44, 4 (2014), 631-642.

What is claimed is:

1. A massive multiple-input multiple-output (M-MIMO) method for processing data, the method comprising:
simultaneously receiving, at N antennas, a received signal (y), which corresponds to M data streams transmitted from M antennas, where N and M are natural numbers larger than 2;
gradually generating a tree with M layers of nodes (P, $P_i$), which correspond, at the end, to all possible combinations of symbols included in the received signal (y);
dividing the tree into plural subtrees;
simultaneously calculating,
  (1) with a master processor, distances between the received signal (y) and leaf nodes (P) of the tree, along a subtree of the plural subtrees, using a first approach, and
  (2) with plural slave processors, distances between the received signal (y) and other leaf nodes ($P_i$) of the tree, along corresponding subtrees of the plural subtrees, using a second approach, different from the first approach; and
estimating a transmitted signal (s) transmitted by the M antennas, based on a smallest distance corresponding to the leaf nodes (P) and the other leaf nodes ($P_i$),
wherein the transmitted signal (s) is a vector having M components and the received signal (y) is a vector having N components.

2. The method of claim 1, wherein the first approach is a sphere decoder (SD) approach and the second approach is a K-best approach.

3. The method of claim 1, wherein the master processor divides the tree into the plural subtrees.

4. The method of claim 1, further comprising, for each of the master processor and the slave processors:
branching a corresponding subtree;
evaluating a distance of each node from the received signal (y); and
removing nodes that are outside a sphere determined by a radius r.

5. The method of claim 4, further comprising:
sharing the radius r by all the master processor and the slave processors.

6. The method of claim 4, further comprising:
dynamically adjusting the radius r by ordering the nodes in the tree based on the calculated distances; and
selecting a new value of the radius by taking a smallest distance of a leaf node corresponding to a last level in a subtree of the master processor and a node corresponding to a last level in a subtree of the slave processors.

7. The method of claim 4, further comprising:
branching each node over plural symbols at a given time.

8. The method of claim 4, further comprising:
storing the distance of each node at a given level; and
evaluating distances for nodes at a next level by using the stored distance from the given level.

9. The method of claim 2, wherein the K-best approach maintains only K nodes at each level, where K is a non-zero natural number.

10. The method of claim 1, wherein the step of calculating is performed independently by each of the master processor and the slave processors.

11. The method of claim 1, further comprising:
evaluating, at the master processor, a load of the slave processors; and
redistributing a work load of the slave processors to be substantially even.

12. A massive multiple-input multiple-output (M-MIMO) system comprising:
N antennas configured to simultaneously receive a received signal (y), which corresponds to M data streams transmitted from M antennas, where N and M are natural numbers larger than two;

a master processor configured to gradually generate a tree with M layers of nodes (P, $P_i$), which correspond to all possible combinations of symbols included in the received signal (y);

the master processor also being configured to divide the tree into plural subtrees, and calculate distances between the received signal (y) and leaf nodes (P) of the tree, along a subtree of the plural subtrees, using a first approach; and slave processors configured to calculate, simultaneously with the master processor, distances between the received signal (y) and other leaf nodes ($P_i$) of the tree, along corresponding subtrees of the plural subtrees, using a second approach, different from the first approach, wherein the master processor is configured to estimate a transmitted signal (s) transmitted by the M antennas, based on a smallest distance corresponding to the leaf nodes (P) and the other leaf nodes ($P_i$), and wherein the transmitted signal (s) is a vector having M components and the received signal (y) is a vector having N components.

13. The system of claim 12, wherein the first approach is a sphere decoder approach and the second approach is a K-best approach.

14. The system of claim 12, wherein the master processor divides the tree into the plural subtrees.

15. The system of claim 12, wherein each of the master processor and the slave processors is configured to:
branch a corresponding node;
evaluate a distance of each node from the received signal (y); and
remove nodes that are outside a sphere determined by a radius r.

16. The system of claim 15, wherein all the master processor and the slave processors share the radius r.

17. The system of claim 15, wherein the radius r is dynamically adjusted by ordering the nodes in the tree based on the calculated distances and a new value of the radius is selected by taking a smallest distance of the nodes in a last level of a subtree of the master processor and a subtree of the slave processors.

18. The system of claim 15, wherein each node is branched over plural symbols.

19. The system of claim 13, wherein the K-best approach maintains only K nodes at each level, where K is a non-zero natural number.

20. The system of claim 12, wherein each of the master processor and the slave processors independently calculate the distances.

* * * * *